United States Patent
Sivavakeesar et al.

(10) Patent No.: US 12,445,952 B2
(45) Date of Patent: Oct. 14, 2025

(54) COMMUNICATION SYSTEM AND METHODS THAT ADAPT RRC PROCEDURES TO A 5G NETWORK IMPLEMENTING NETWORK SLICING

(71) Applicant: NEC Corporation, Tokyo (JP)

(72) Inventors: Sivapathalingham Sivavakeesar, Surrey (GB); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/602,108

(22) Filed: Mar. 12, 2024

(65) Prior Publication Data

US 2024/0306086 A1 Sep. 12, 2024

Related U.S. Application Data

(63) Continuation of application No. 16/475,798, filed as application No. PCT/JP2017/045491 on Dec. 19, 2017.

(30) Foreign Application Priority Data

Jan. 6, 2017 (GB) ...................................... 1700270
Jan. 11, 2017 (GB) ...................................... 1700505

(51) Int. Cl.
  *H04W 48/18* (2009.01)
  *H04W 36/00* (2009.01)
  *H04W 60/04* (2009.01)
(52) U.S. Cl.
  CPC ....... *H04W 48/18* (2013.01); *H04W 36/0069* (2018.08); *H04W 36/00695* (2023.05); *H04W 36/00835* (2018.08); *H04W 60/04* (2013.01)

(58) Field of Classification Search
  CPC ............. H04W 48/18; H04W 36/0069; H04W 36/00835; H04W 60/04
  See application file for complete search history.

(56) References Cited

U.S. PATENT DOCUMENTS

| 10,313,887 B2 | 6/2019 | Vrzic et al. |
| 10,448,320 B2 | 10/2019 | Vrzic et al. |
| 2010/0267405 A1 | 10/2010 | Chin et al. |

(Continued)

FOREIGN PATENT DOCUMENTS

| CN | 102652455 A | 8/2012 |
| CN | 106060900 A | 10/2016 |

(Continued)

OTHER PUBLICATIONS

Chinese Office Action for CN Application No. 202210743464.6 mailed on Feb. 6, 2024 with English Translation.

(Continued)

*Primary Examiner* — Syed Ali
(74) *Attorney, Agent, or Firm* — Sughrue Mion, PLLC

(57) ABSTRACT

A communication system is disclosed in which a number of procedures may be performed between user equipment, a base station, and/or the core network in the context of network slicing. The procedures support, for example efficient configuration of paging areas, roaming, access restriction, mobility, setting up of dual mode connectivity, connection re-establishment, efficient paging and slice selection.

4 Claims, 19 Drawing Sheets

(56) References Cited

U.S. PATENT DOCUMENTS

| | | | |
|---|---|---|---|
| 2011/0261688 A1 | 10/2011 | Sharma et al. | |
| 2013/0115955 A1 | 5/2013 | Deng et al. | |
| 2016/0353367 A1 | 12/2016 | Vrzic et al. | |
| 2016/0353422 A1 | 12/2016 | Vrzic et al. | |
| 2016/0353465 A1 | 12/2016 | Vrzic et al. | |
| 2016/0373975 A1 | 12/2016 | Xu et al. | H04W 72/20 |
| 2017/0070892 A1* | 3/2017 | Song | H04L 41/5051 |
| 2017/0164349 A1 | 6/2017 | Zhu et al. | |
| 2017/0332421 A1 | 11/2017 | Sternberg | H04W 12/0602 |
| 2017/0367036 A1* | 12/2017 | Chen | H04L 41/122 |
| 2019/0007899 A1 | 1/2019 | Vrzic et al. | |
| 2019/0045351 A1 | 2/2019 | Zee et al. | |
| 2019/0158360 A1 | 5/2019 | Xu | H04W 24/10 |
| 2019/0174561 A1* | 6/2019 | Sivavakeesar | H04W 76/10 |
| 2019/0289534 A1* | 9/2019 | Ryoo | H04W 48/18 |
| 2019/0357129 A1 | 11/2019 | Park | H04W 60/04 |
| 2019/0357130 A1 | 11/2019 | Garcia Azorero | H04W 8/08 |
| 2019/0387393 A1* | 12/2019 | Xu | H04W 60/00 |
| 2020/0059989 A1 | 2/2020 | Velev | H04W 36/12 |
| 2020/0145953 A1 | 5/2020 | Youn et al. | |

FOREIGN PATENT DOCUMENTS

| | | |
|---|---|---|
| CN | 106131891 A | 11/2016 |
| EP | 3534644 A1 | 9/2019 |
| GB | 2552844 A | 2/2018 |
| WO | 2016/023157 A1 | 2/2016 |
| WO | 2016190672 A1 | 12/2016 |
| WO | 2022/074769 A1 | 4/2022 |

OTHER PUBLICATIONS

3GPP TR 38.801 V0.4.0, 3rd Generation Partnership Project, Technical Specification Group Radio Access Network, Study on New Radio Access Technology, Radio Access Architecture and Interfaces (Release 14), Sep. 13, 2016.
"A Deliverable by the NGMN Alliance NGMN 5G White Paper"V1.0 by the Next Generation Mobile Networks (NGMN) Alliance, Fenb. 17, 2015, 125 pages, https://www.ngmn.org/5g-white-paper/5g-white-paper.html.
"Network Slice Selection Procedure", ZTE 3GPP TSG RAN WG3 Meeting #92, R3-161107, May 22, 2016, vol. RAN WG3, No. Nanjing, China.
"3rd Generation Partnership Project; Technical Specification Group Radio Access Network, Study on New Radio Access Technology; Radio Access Architecture and Interfaces (Release 14)", 3GPP TR 38.801, V0.4.0, Sep. 13, 2016, vol. RAN WG3, No. V0.4.0.
"NG Interface functions", Huawei, 3GPP TSG-RAN WG3 Meeting #93 BIS. R3-162302, Oct. 6, 23016. vol. RAN WG3, No. Sophia Antipolis, France.
Written Opinion for PCT/JP2017/045491, dated May 16, 2018.
International Search Report for PCT/JP2017/045491, dated May 18, 2018.
"UE context handling during inter RAT handover", Ericsson, 3GPP TSG-RAN WG2 #95-bis, R2-166787, Oct. 10-14, 2016, (3 pages total).
"RAN2 impacts on slicing", Intel Corporation, 3GPP TSG RAN WG2 Meeting #96, R2-168504, Nov. 14-18, 2016 (5 pages total).
"Procedure of initial access", Huawei, 3GPP TSG-RAN WG3 Meeting #94, R3-162951, Nov. 14-18, 2016 (2 pages total).
3rd Generation Partnership Project, Technical Specification Group Radio Access Network, Study on New Radio Access Technology, Radio Access Architecture and Interfaces (Release 14), 3GPP TR 38.801, V1.0.0 Dec. 8, 2016, (72 pages total).
Convenor summary of email discussion about "NS selection assistance information from the UE/Network", ZTE 8 Huawei(email discussion convenors), SA WG2 Meeting #116BIS. S2-165377, Aug. 29, 2015-Sep. 2, 2016, (11 pages total).
"Clarification on the Service based interface", Huawei, Hisilicon, CATR, China Mobile, Deutsche Telekom, SA WG2 Meeting #118, S2-167163, Nov. 14-18, 2016, (11 pages total).
Communication dated Jun. 23, 2020, from the Japanese Patent Office in application No. 2019-537000.
3GPP, "3rd Generation Partnership Project; Technical Specification Group Services and System Aspects; Study on Architecture for Next Generation System (Release 14)", 3GPP TR 23.789, V14.0.0. Dec. 2016 (total 522 pages).
XIAOMI "Consideration on the Support of RAN Slicing", 3GPP TSG-RAN WG2 NR Ad Hoc, R2-1700044, Jan. 17-19, 2017 (total 4 pages).
LG Electronics, "Interim agreements on the network slice re-selection", SA WG2 Meeting #118, S2-166474, Nov. 14-16, 2016, (Total 7 pages).
Commuunication dated Aug. 28, 2020 from European Patent Office in EP Application No. 17832826.6.
Communication dated Nov. 9, 2020 from Indian Patent Office in Application No. 201917027058.
Chinese Office Action for CN Application No. 201780088092.5 mailed on Aug. 30, 2021 with English Translation.
European Office Action for EP Application No. 17832826.6 malled on Dec. 20, 2021.
Japanese Office Action for JP Application No. 2020-201468 mailed on Feb. 8, 2022 with English Translation.
Sony, Network and RAN slicing, 3GPP TSG RAN WG2 Meeting #Adhoc R2-1700146, Jan. 17-19, 2017.
JP Office Action for JP Application No. 2022-169016, mailed on Aug. 29, 2023 with English Translation.
US Office Action for U.S. Appl. No. 16/475,798, mailed on Feb. 28, 2025.
US Office Action for U.S. Appl. No. 18/602,501, mailed on May 2, 2025.
CN Official Communication for CN Application No. 202210742875.3, mailed on Apr. 30, 2025 with English Translation.
3GPP TR 23.799 V0.1.0.
3GPP TR 23.799 V0.1.1.
3GPP TR 23.799 V0.2.0.
3GPP TR 23.799 V0.3.0.
3GPP TR 23.799 V0.4.0.
3GPP TR 23.799 V0.5.0.
3GPP TR 23.799 V0.6.0.
3GPP TR 23.799 V0.7.0.
US Notice of Allowance for U.S. Appl. No. 16/475,798, mailed on Jun. 27, 2025.
US Office Action for U.S. Appl. No. 18/602,501, mailed on Sep. 5, 2025.

* cited by examiner

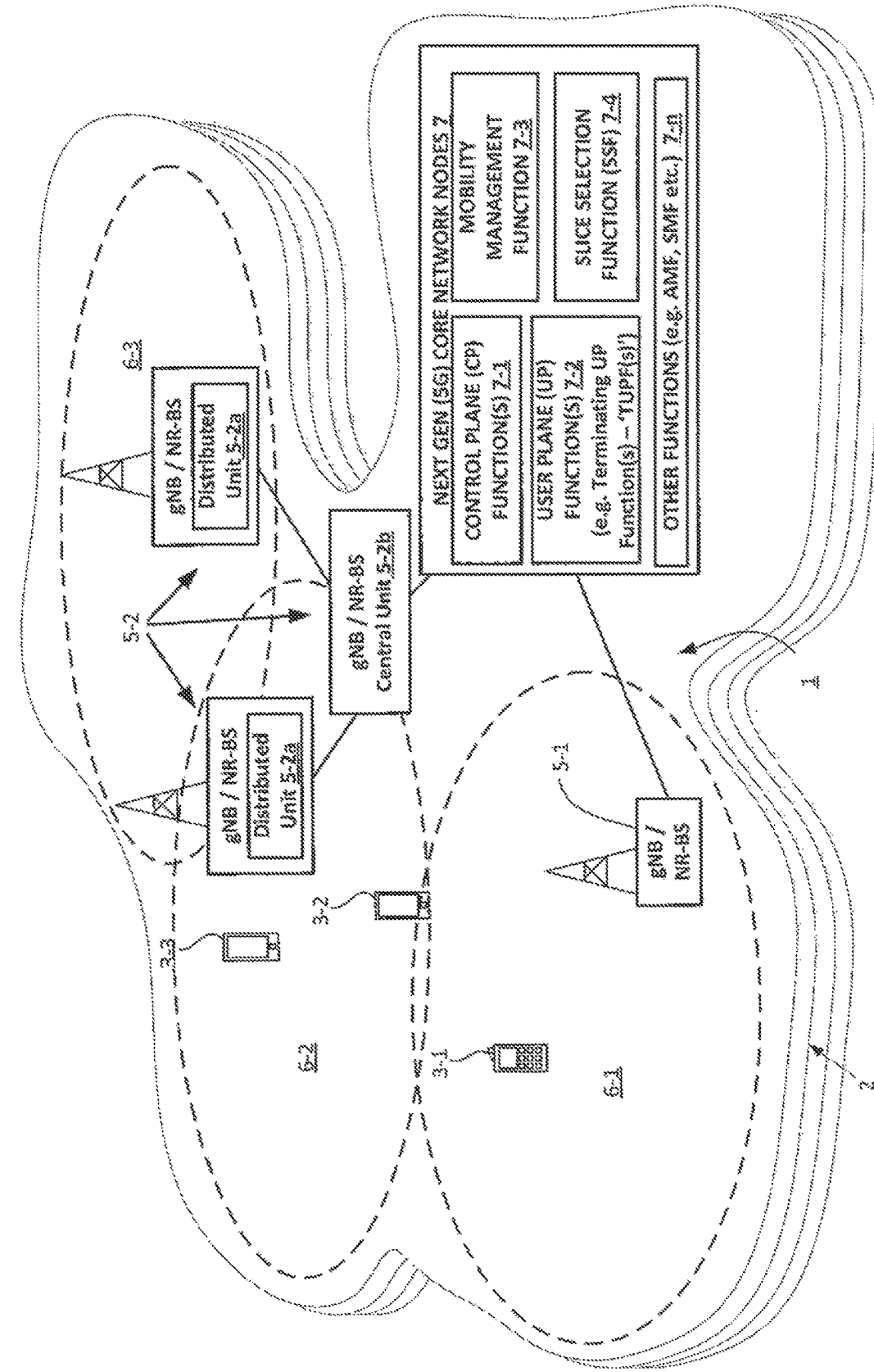
[Fig. 1]

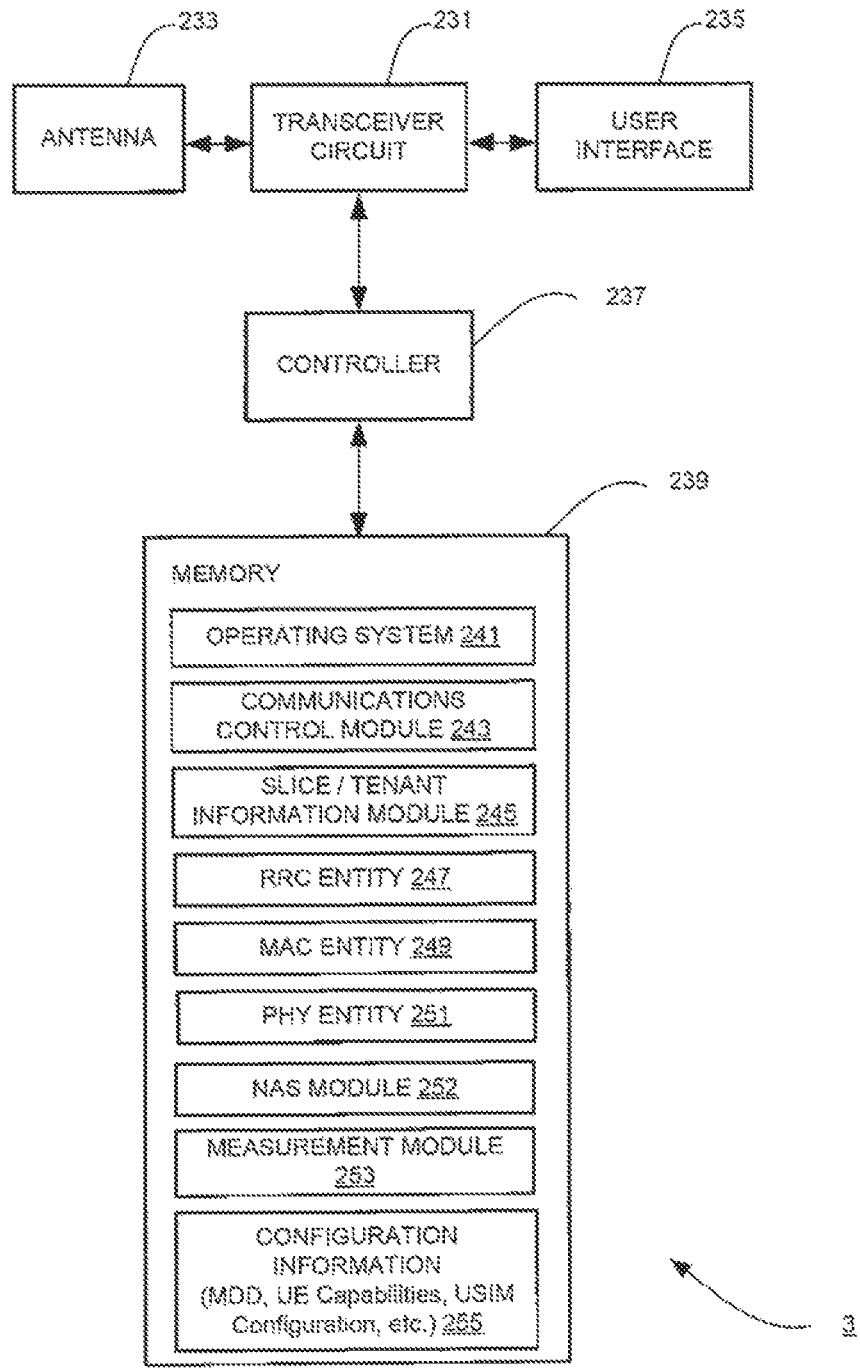

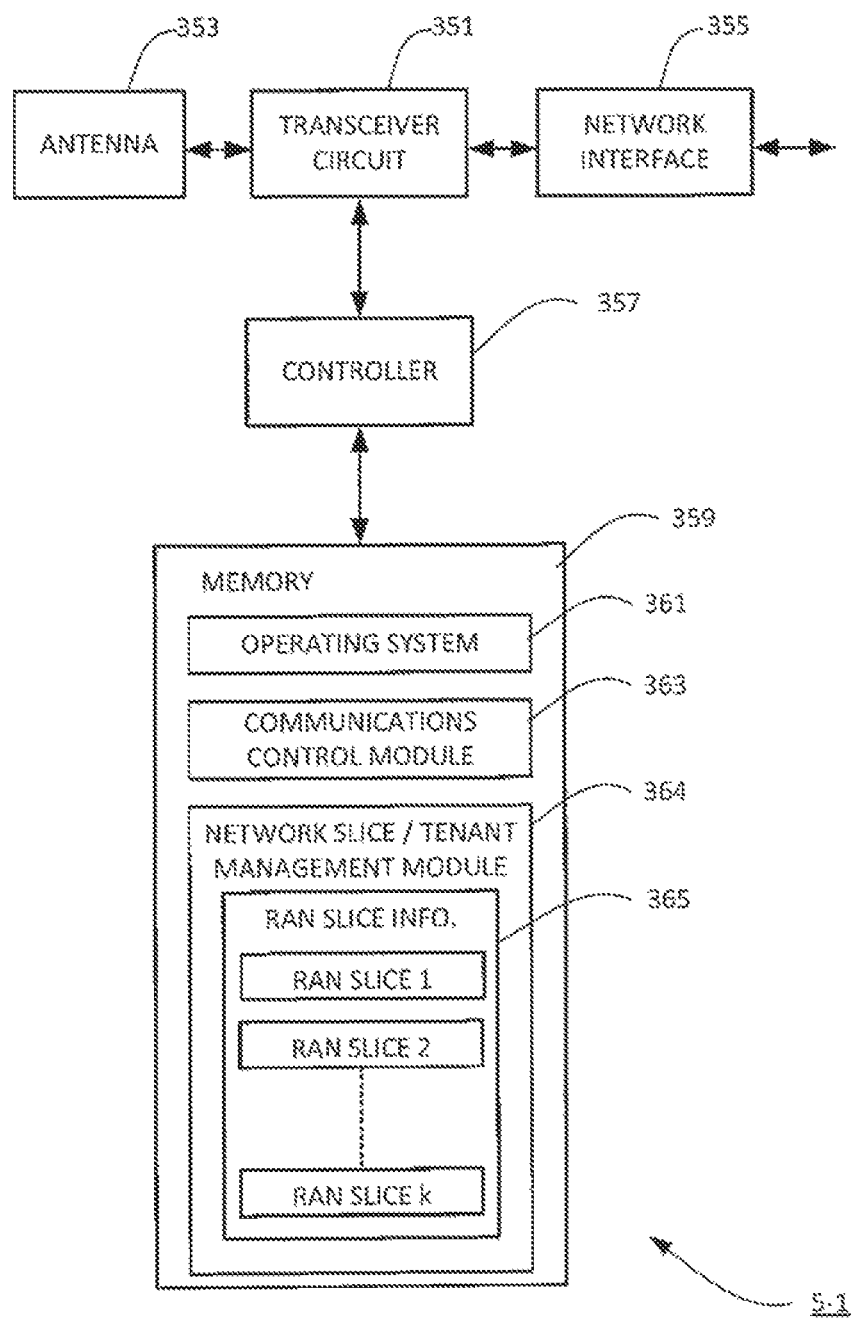

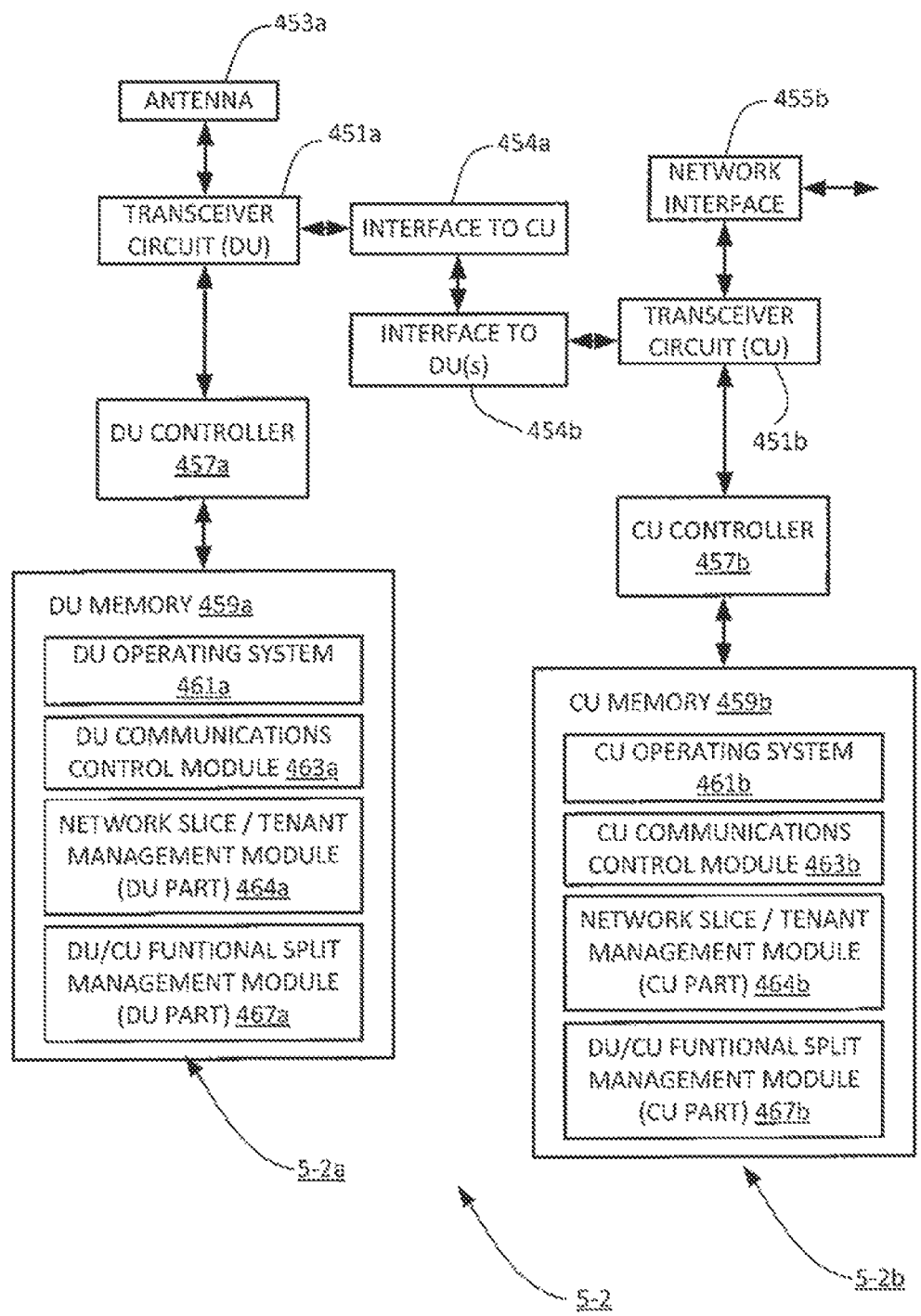
[Fig. 4]

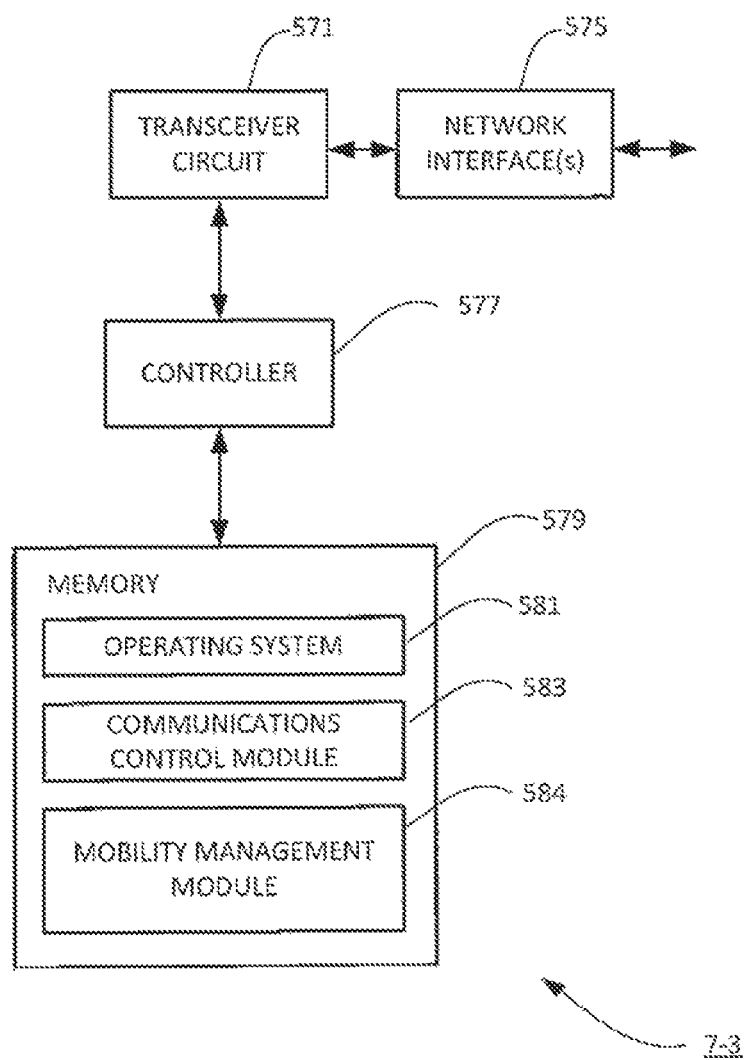
[Fig. 5]

[Fig. 6]
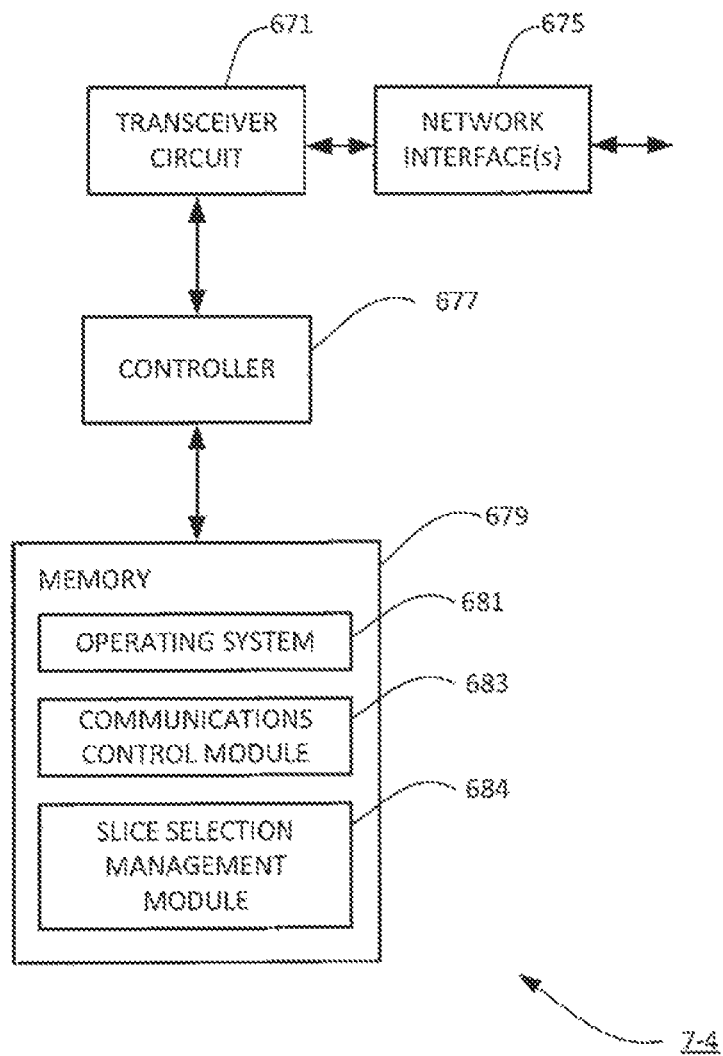

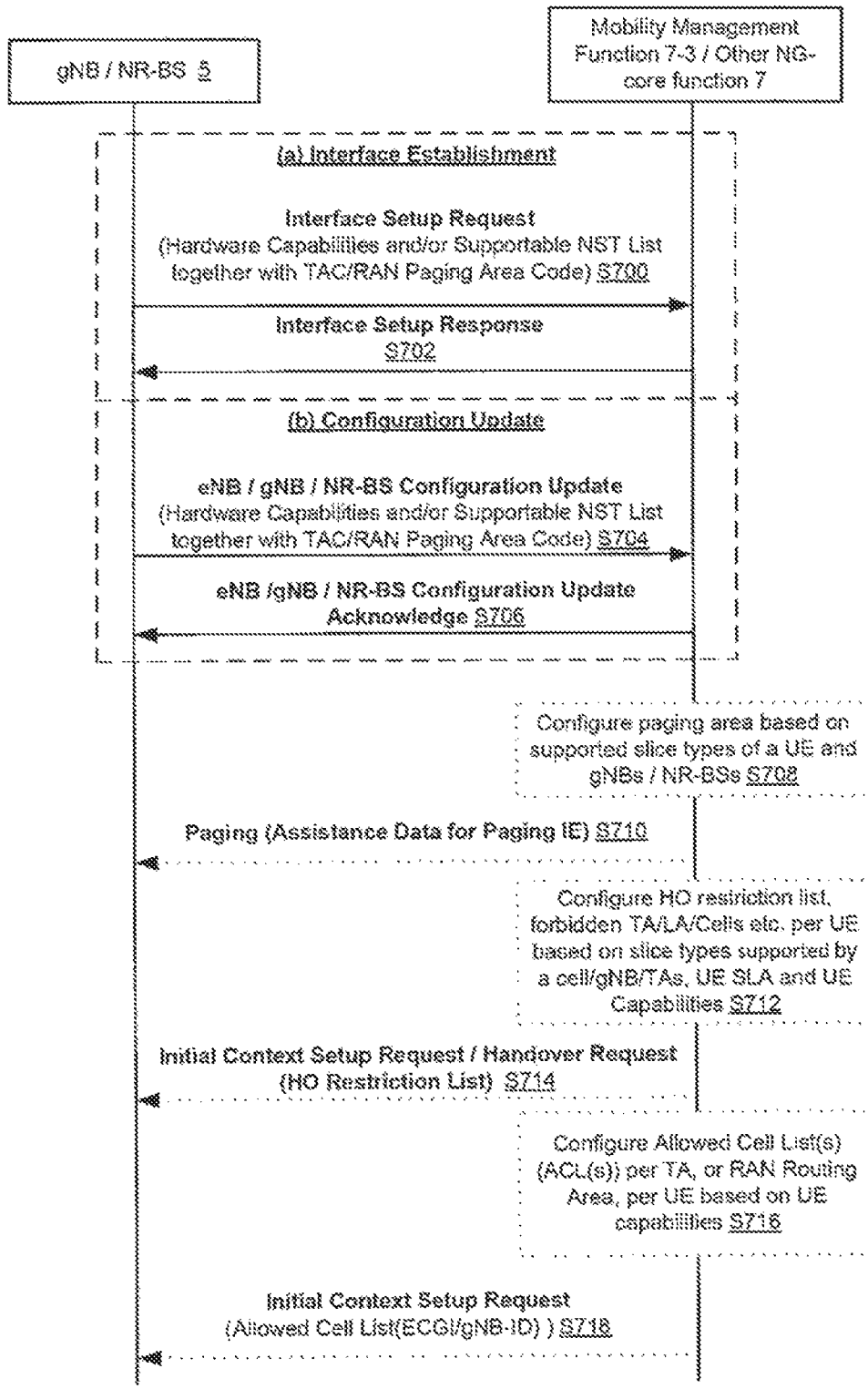
[Fig. 7]

[Fig. 8]

Handover Restriction List

| IE/Group Name | Presence | Range | IE type and reference | Semantics description |
|---|---|---|---|---|
| Serving PLMN | M | | 9.2.3.8 | |
| Equivalent PLMNs | | 0..<maxnoofEPLMNs> | | Allowed PLMNs in addition to Serving PLMN. This list corresponds to the list of "equivalent PLMNs" as defined in TS 24.301 [24]. This list is part of the roaming restriction information. Roaming restrictions apply to PLMNs other than the Serving PLMN and Equivalent PLMNs. |
| >PLMN Identity | M | | 9.2.3.8 | |
| Forbidden TAs | | 0..<maxnoofEPLMNs PlusOne> | | Intra LTE roaming restrictions. |
| >PLMN Identity | M | | 9.2.3.8 | The PLMN of forbidden TACs. |
| >Forbidden TACs | M | 1..<maxnoofForbTACs> | | |
| >>TAC | M | | 9.2.3.7 | The TAC of the forbidden TAI. |
| Forbidden LAs | | 0..<maxnoofEPLMNs PlusOne> | | Inter-3GPP RAT roaming restrictions. |
| >PLMN Identity | M | | 9.2.3.8 | |
| >Forbidden LACs | M | 1..<maxnoofForbLACs> | | |
| >>LAC | M | | OCTET STRING (SIZE(2)) | |
| Forbidden Inter RATs | O | | ENUMERATED(ALL, GERAN, UTRAN, CDMA2000, ..., GERAN and UTRAN, CDMA2000 and UTRAN) | Inter-3GPP and 3GPP2 RAT access restrictions. |
| Forbidden cells | | | | |
| >Global gNB ID | | | | |
| >>ECGI | | | | |

800

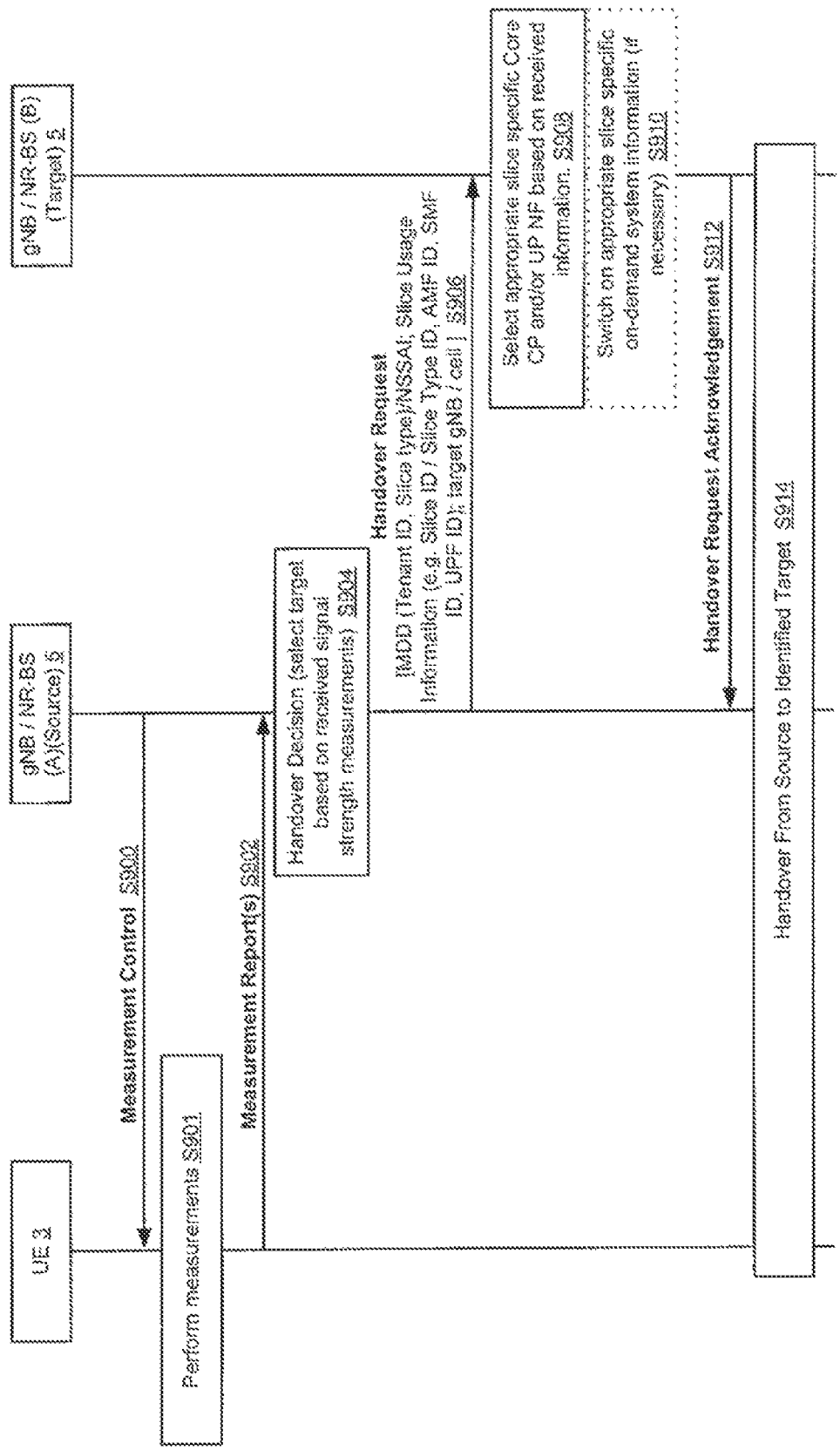

[Fig. 10]

Handover Request

| IE/Group Name | Presence | IE Type and reference |
|---|---|---|
| Message Type | M | 9.2.13 |
| Old eNB UE X2AP ID | M | eNB UE X2AP ID |
| Cause | M | 9.1.24 |
| Target Cell ID | M | 9.2.6 |
| | | ECGI |
| GUMMEI | M | 9.2.14 |
| UE Context Information | | 9.2.16 |
| >MME UE S1AP ID | M | INTEGER (0..2^32-1) |
| >UE Security Capabilities | M | 9.2.29 |
| >AS Security Information | M | 9.2.30 |
| >UE Aggregate Maximum Bit Rate | M | 9.2.12 |
| >Subscriber Profile ID for RAT/Frequency priority | O | 9.2.25 |
| >E-RABs To Be Setup List | | |
| >>E-RABs To Be Setup Item | | |
| >>Bearer Type | O | 9.2.92 |
| >RRC Context | M | OCTET STRING |
| >Handover Restriction List | O | 9.2.3 |
| UE History Information | M | 9.2.38 |
| V2X Services Authorized | O | 9.2.03 |
| MUD Vector | | |
| UE Temp ID | | |
| Slice Usage List | | |
| >Slice Type (NST) ID | | |
| >NG-C CP NF ID (e.g. CCNF ID) | | |
| >>AMF ID | | |
| >>SMF ID | | |
| >>UPF ID | | |
| >QoS Flow ID | | |
| >> DL Forwarding | | |
| >> UL GTP Tunnel Endpoint | | |

1000

[Fig. 11]
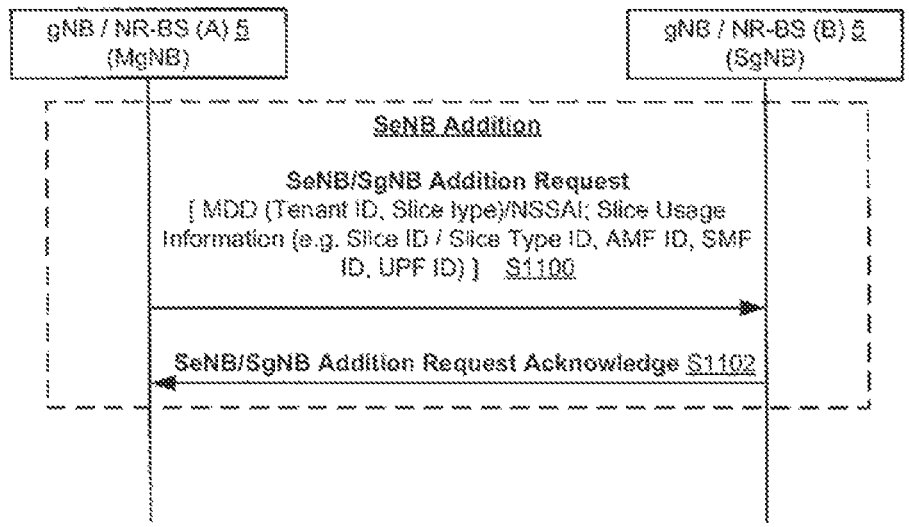
[Fig. 12]
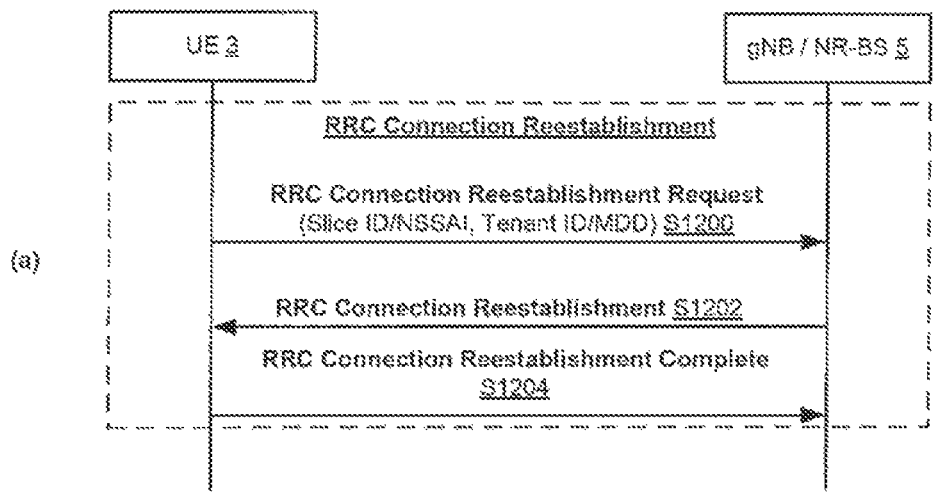
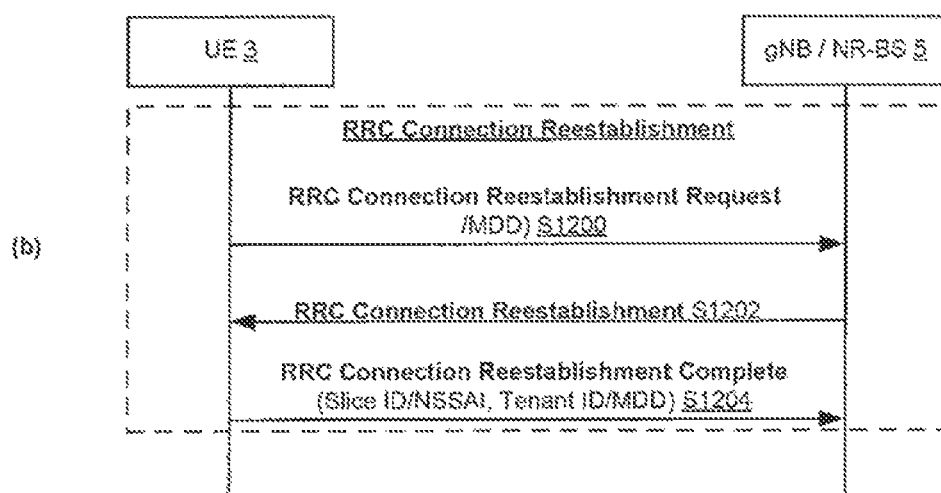

[Fig. 13]

```
                RRCConnectionReestablishmentRequest

-- ASN1START

RRCConnectionReestablishmentRequest ::= SEQUENCE {
    criticalExtensions              CHOICE {
        rrcConnectionReestablishmentRequest-r8

RRCConnectionReestablishmentRequest-r8-IEs,
        criticalExtensionsFuture    SEQUENCE {}
    }
}

RRCConnectionReestablishmentRequest-r8-IEs ::= SEQUENCE {
    ue-Identity                     ReestabUE-Identity,
    reestablishmentCause            ReestablishmentCause,
    spare                           BIT STRING (SIZE (2))
}

ReestabUE-Identity ::=              SEQUENCE {
    c-RNTI                          C-RNTI,
    physCellId                      PhysCellId,
    shortMAC-I                      ShortMAC-I
    Slice-ID/NSSAI
    TennantID/MDD
}
                                    1300
ReestablishmentCause ::=            ENUMERATED {
                                    reconfigurationFailure, handoverFailure,
                                    otherFailure, spare1}

-- ASN1STOP
```

[Fig. 14]
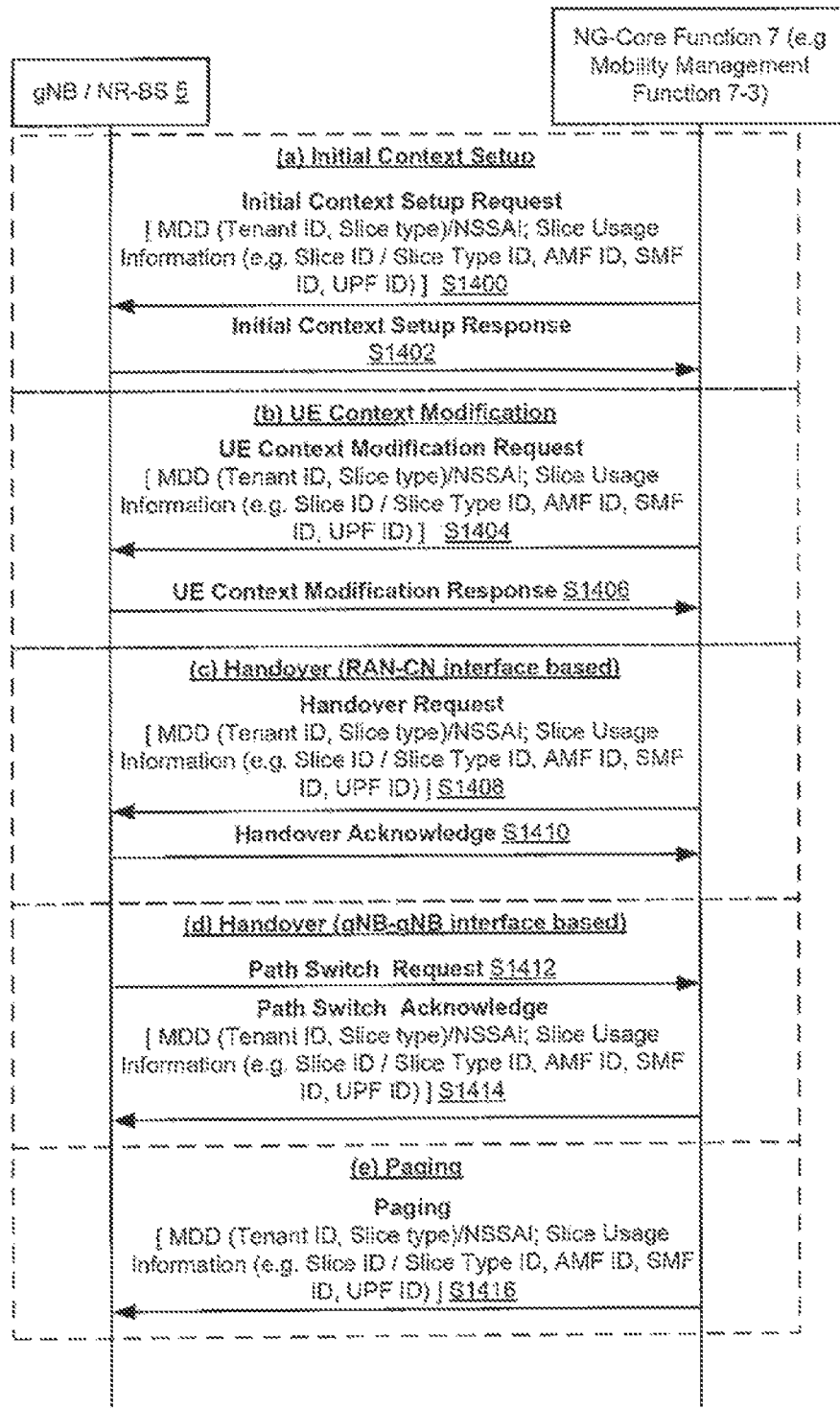

[Fig. 15]
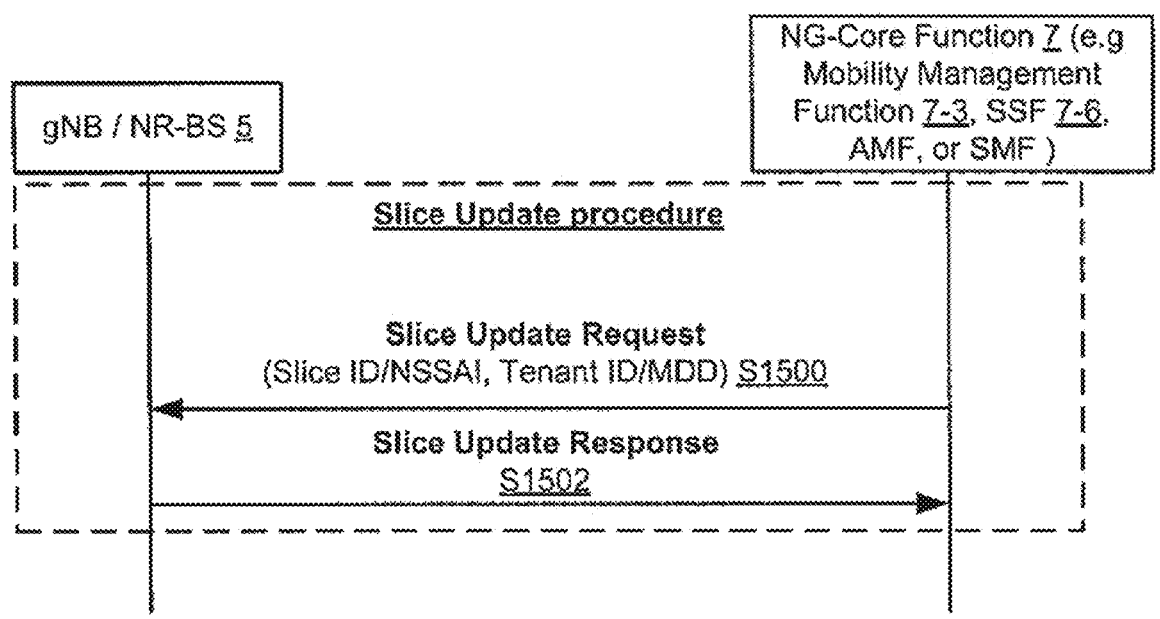

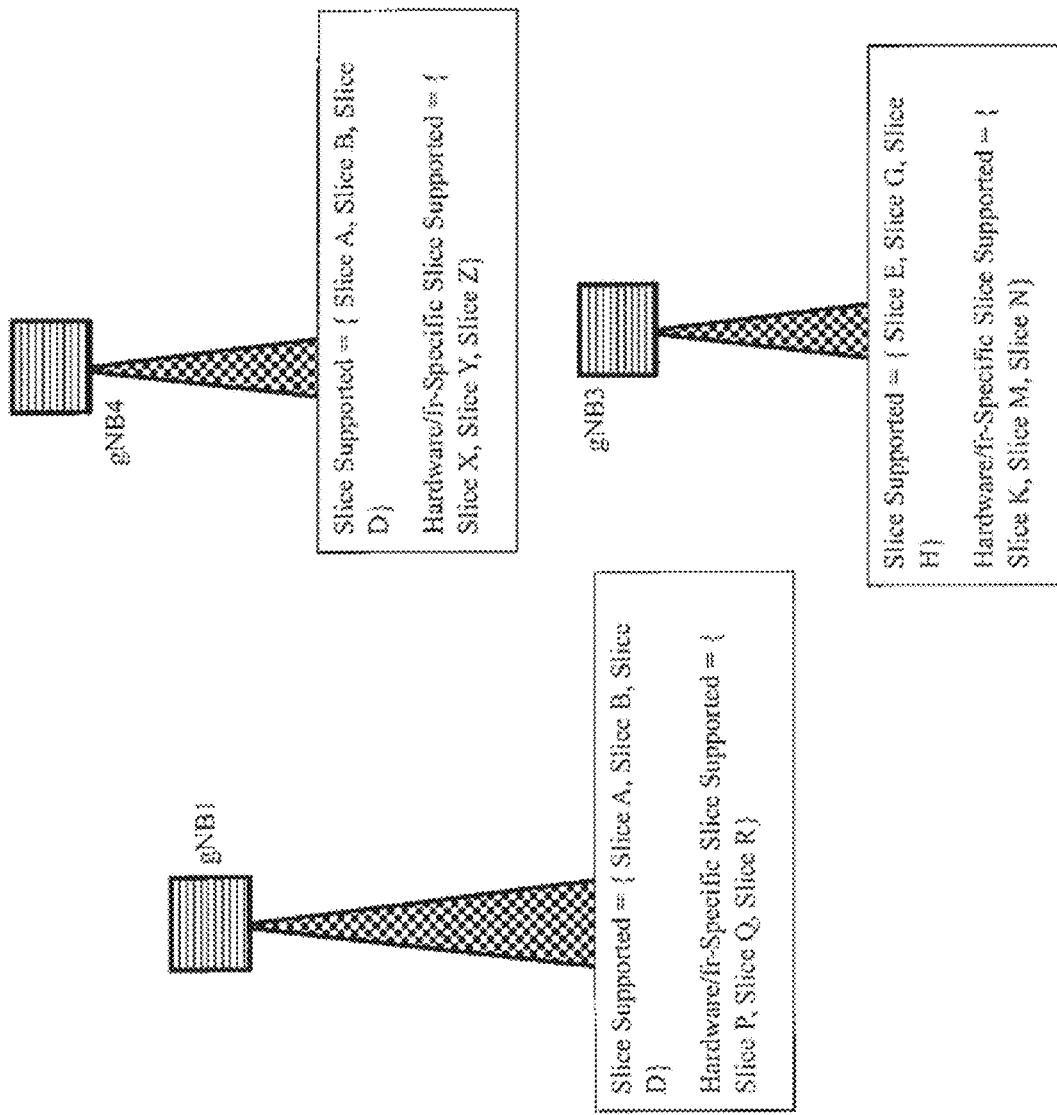
[Fig. 16]

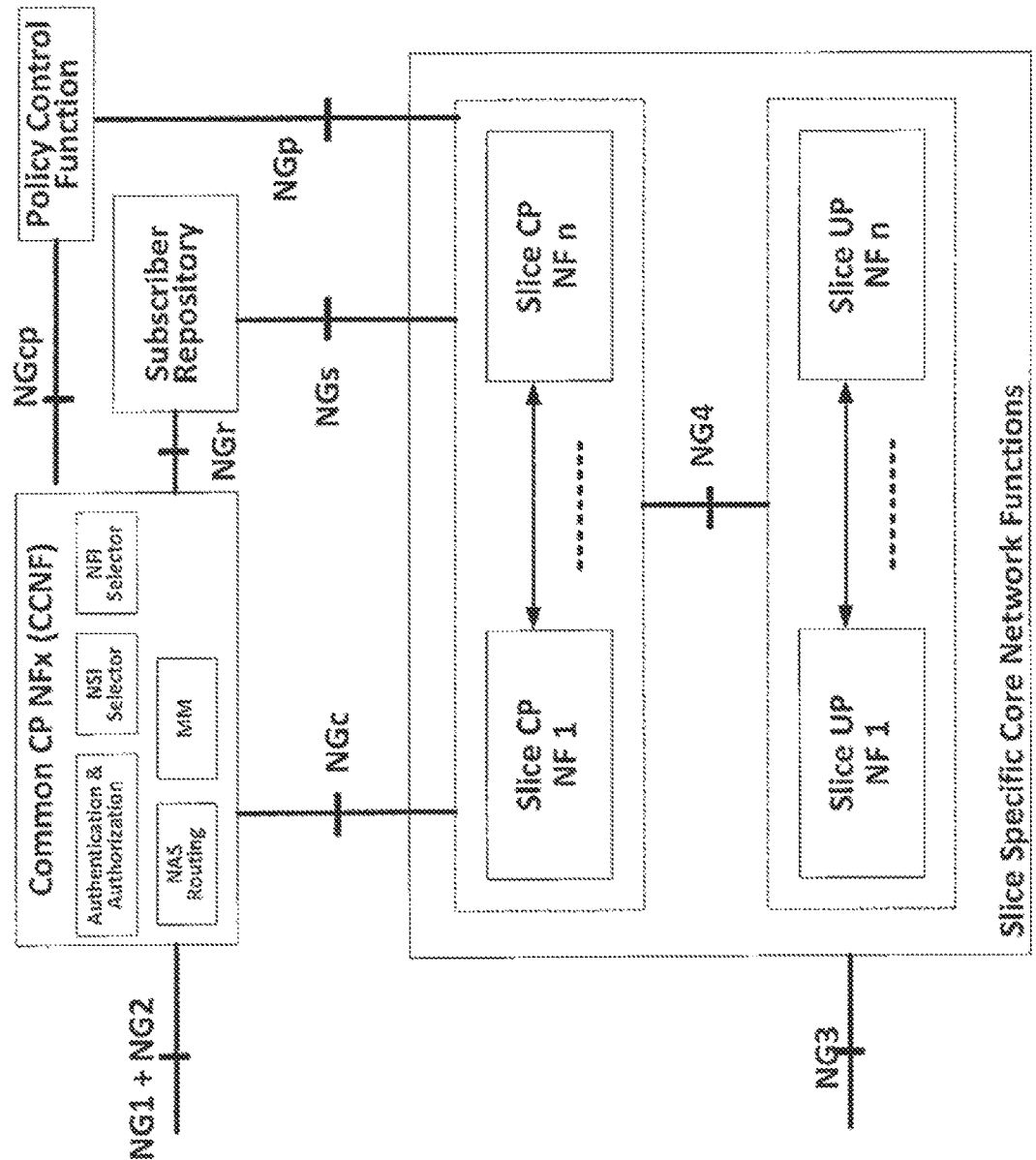
[Fig. 17]

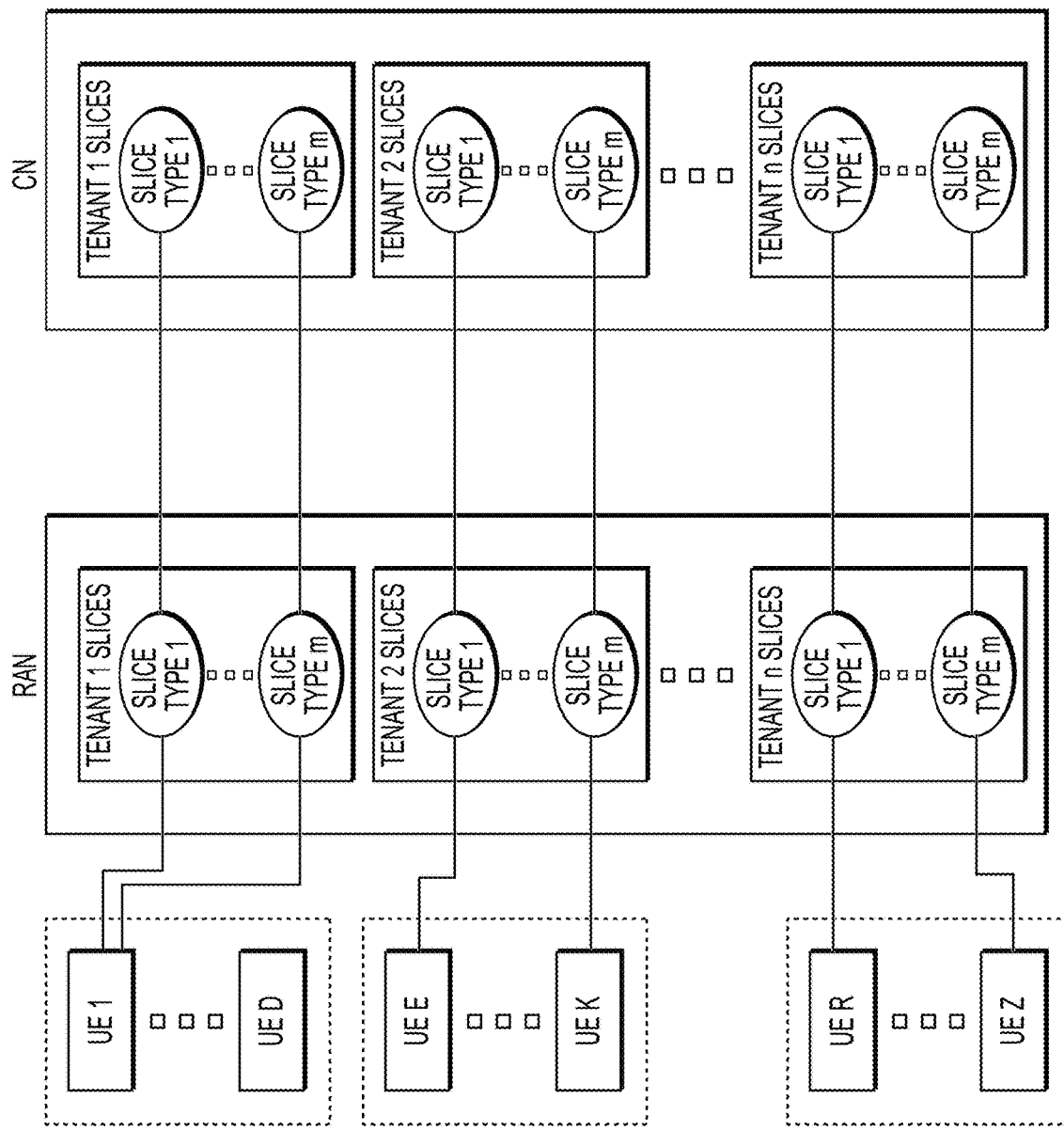
[Fig. 18]

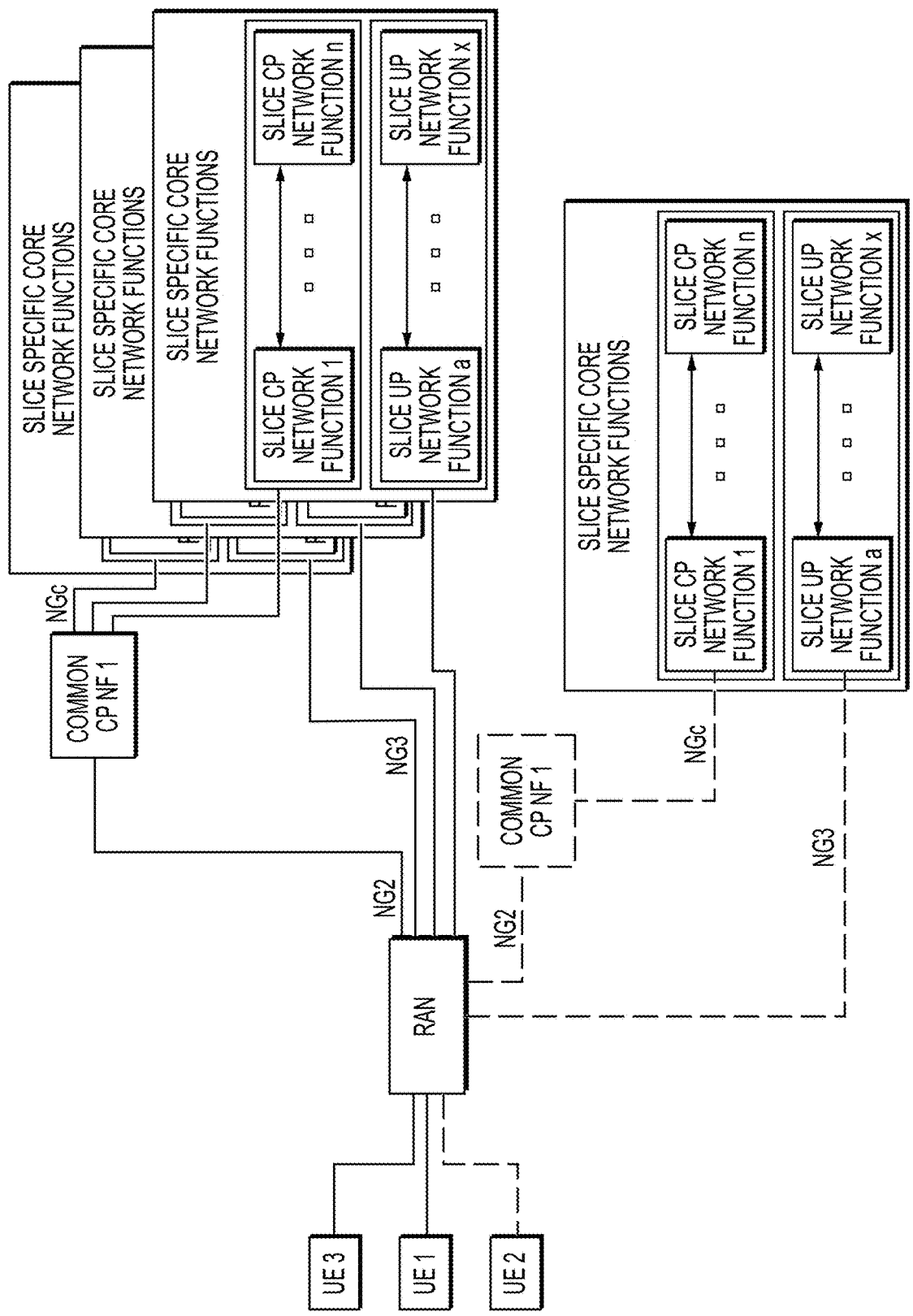
[Fig. 19]

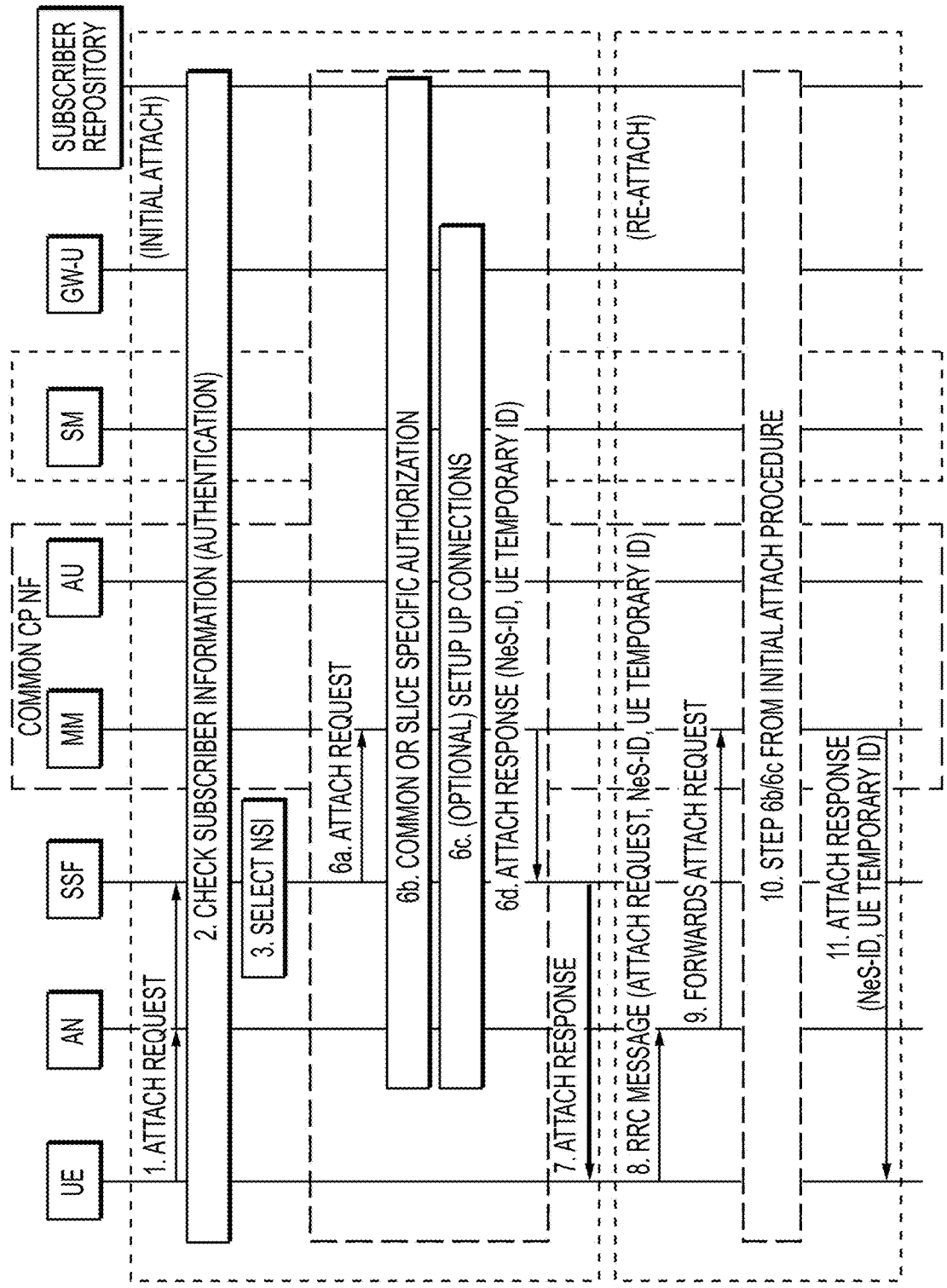
[Fig. 20]

COMMUNICATION SYSTEM AND METHODS THAT ADAPT RRC PROCEDURES TO A 5G NETWORK IMPLEMENTING NETWORK SLICING

CROSS-REFERENCE TO RELATED APPLICATIONS

This application is a Continuation of U.S. application Ser. No. 16/475,798 filed on Jul. 3, 2019, which is a National Stage Entry of PCT/JP2017/045491 filed on Dec. 19, 2017, which is based upon and claims the benefit of priority from United Kingdom patent applications No. 1700270.0, filed on Jan. 6, 2017 and No. 1700505.9, filed on Jan. 11, 2017, the disclosures of which are incorporated herein in their entirety by reference.

TECHNICAL FIELD

The present invention relates to a radio access network in a cellular or wireless telecommunications network, and particularly but not exclusively to sharing the radio access network between multiple operators. The invention has particular but not exclusive relevance to wireless telecommunications networks implemented according to various standards defined by the $3^{rd}$ Generation Partnership Project (3GPP). For example, the invention has relevance to Long Term Evolution (LTE) networks, LTE Advanced (LTE-A) networks, related enhancements to and developments of LTE/LTE-A, and to the more recent development of communication technologies beyond LTE/LTE-A into so called '5G', 'next generation' (NG) or 'new radio' (NR) technologies.

BACKGROUND ART

Radio Access Network (RAN) sharing deployment scenarios are known and methods and abilities to facilitate implementations of these scenarios have been introduced into the 3rd Generation Partnership Project (3GPP) standards since Release 5.

Traditionally, RAN sharing provides a way for network operators (service providers) to reduce their capital expenditure requirements and/or widen the area covered by a cellular communication service when setting up a wireless communications network. Rather than each operator having to provide their own base station and associated equipment for each cell of the network, an operator sharing the RAN of another operator is able to provide their service into areas served by the other operator without having to invest in their own base stations in that location.

Furthermore, by reducing the number of base stations that must be provided and operated (reducing the CAPEX), the on-going operating costs (OPEX) can be reduced for the sharing operators. Indeed, each base station may draw a large amount of electricity during operation, and therefore reducing the number of operating base stations may significantly reduce electrical power requirements and may therefore also be considered environmentally friendly.

Typically, sharing of RANs by operators has been a fixed long-term agreement in which each operator gets some access to the RAN of the other operator. RAN sharing is particularly advantageous in areas in which an operator has cell capacity that is underused, as this spare capacity can then be shared with no impact on the original operator's on-going service provision. Furthermore, RAN sharing may be useful in order to ensure that a service provided by an operator is able to reach a certain percentage of the population, which may be specified by license conditions in some countries, without requiring each operator to install expensive capacity in remote areas in which it is likely to be underutilized.

The terms '5G' and 'new radio' (NR) refer to an evolving communication technology that is expected to support a variety of applications and services such as Machine Type Communications (MTC), Internet of Things (IoT) communications, vehicular communications and autonomous cars (V2V/V2X), high resolution video streaming, smart city services, and/or the like. Accordingly, 5G/NR technologies are expected to enable network access to vertical markets and support network sharing for offering networking services to third parties and creating new business opportunities. Whilst a base station of a 5G/NR communication system is commonly referred to as a New Radio Base Station ('NR-BS') or as a 'gNB' it will be appreciated that they may be referred to using the term, eNB (or 5G/NR eNB) which is more typically associated with LTE base stations.

Recently, it has been proposed that the functionality of a gNB (referred to herein as a 'distributed' gNB) may be split between one or more distributed units (DUs) and a central unit (CU) with a CU typically performing higher level functions and communication with the next generation core network (the skilled person will appreciate that either the term "core network" or "core" may be used) and with the DU performing lower level functions and communication over an air interface with user equipment (UE) in the vicinity (i.e. in a cell operated by the gNB).

In order to support such a variety of applications and services, the mobile network operators must meet diverse, often conflicting requirements of these applications and need to handle high volumes of data traffic. For example, some of these applications may have relatively lenient Quality of Service/Quality of Experience (QoS/QoE) requirements, while some applications may have relatively stringent QoS/QoE requirements (e.g. high bandwidth and/or low latency).

As it would be expensive and unfeasible to deploy dedicated network infrastructure for each service or application type, network virtualization and 'network slicing' are seen as flexible and cost effective ways to support and accommodate heterogeneous applications with diverse demands over a common network infrastructure. Such network slicing is described in, for example, Non Patent Literature 1. Effectively, a network slice represents a logical network, typically with respect to a particular service level agreement (SLA) for a specific tenant. In effect, each slice represents a specific system behaviour (or set of behaviours). A Tenant of a network (e.g. a public land mobile network (PLMN)) is a wholesale customer of the network. For instance, a tenant may be a big company, or an agency which requires a PLMN to provide at least access to a predefined set of resources, or some specific policies in handling its slice's subscribers at times of congestion. An example of a tenant may include a public safety agency. The tenant may also need application specific requirements. For instance in an enterprise deployment the enterprise may have a factory floor set of devices and devices that are associated to non-factory floor operations. The enterprise may have a policy to allocate at least 60% of resources (whether in the RAN or in the core network) to factory floor operation at times of congestion but not to segregate resources at all times.

In more detail, a network slice (e.g. a "5G slice") may support a communication service, of a particular connection type, with a specific way of handling the control-plane and user-plane for that service. In effect, the slice can comprise a plurality of network functions and specific radio access technology (RAT) settings that are combined together for a specific use case, technical and/or business model. Slices need not contain all the same functions, and some functions that may, today, seem essential might even be missing in one or more slices. In essence, the intention is that a slice will provide only the traffic treatment that is necessary for a given use case, and thereby avoid other unnecessary functionality.

By way of example, multiple slices concurrently operating on the same infrastructure may include a slice for typical smartphone use that is configured by setting up fully-fledged smartphone dedicated functions distributed across the network. A slice supporting an automotive use case may also be provided in which security, reliability and latency are critical and for which all the necessary (and potentially dedicated) functions can be instantiated at a cloud edge node, including any vertical application made necessary as a result of latency constraints. Another slice supporting massive machine type (IoT) devices (e.g., sensors) may be provided with basic control-plane functions configured omitting, for example, any mobility functions, with contention based resources for the access. There may be other dedicated slices operating in parallel, and potentially a generic slice providing basic best-effort connectivity, to cope with unknown use cases and traffic.

Each network slice is defined by a respective network slice template (NST) that is a logical representation of the network functions and corresponding resource requirements necessary to provide the required telecommunication services and network capabilities. Each template is used to implement corresponding 'instances' of the respective network slice (referred to as network slice instances (NSI)).

A network slice thus fulfils a number of beneficial purposes, from the perspective of a UE, including:
- providing a given UE with particular system behaviours tailored to specific application needs, from the standpoint of specific control plane (e.g. a UE may/may not: need mobile terminating (MT) procedures, require optimal behaviour for massive machine type communication (MTC), require critical communications (CriC), etc.) or user plane behaviours (e.g. the UE may need a slice supporting header compression);
- providing a UE with access to resources allocated for a specific service, application domain, or Tenant (e.g. a minimum level of guaranteed resources or aggregate number of subscribers allowed to access the service at any point in time).

Currently, it is envisaged that a number of key principles will likely need to be applied for support of Network Slicing in the RAN. Firstly, for example, the RAN will need an awareness of slices. Specifically, the RAN will support a differentiated handling of different network slices which have been pre-configured by the operator. The RAN will also likely support selection of the RAN part of the network slice by means of an identifier, such as a 'slice ID' provided by user equipment (UE), which unambiguously identifies one of the pre-configured network slices (or associated NST) in the public land mobile network (PLMN). Similarly, the RAN will likely support: resource management between slices (e.g. policy enforcement between slices as per service level agreements); QoS differentiation within a slice; and/or resource isolation between slices. The RAN will also likely support RAN selection of a core network (CN) entity, for example for initial routing of uplink messages based on received slice ID and a mapping in the RAN node (CN entity, slices supported). If no slice ID is received, the RAN may select the CN entity based on a NAS (Non Access Stratum) Node Selection Function (NNSF) like function, e.g. based on a UE temporary ID.

Some slices may be available only in part of the network and so awareness, in a base station of the slices supported in the cells of its neighbouring base stations, may be beneficial for inter-frequency mobility for UE which are in connected mode. It is assumed that the slice configuration will not change within a UE's registration area.

The RAN and the CN are responsible for handling a service request for a slice that may or may not be available in a given area. Admission or rejection of access to a slice may depend on factors such as support for the slice, availability of resources, support of the requested service by other slices, and/or the like.

CITATION LIST

Non Patent Literature

[NPL 1]
'NGMN 5G White Paper' V1.0 by the Next Generation Mobile Networks (NGMN) Alliance, which document is available from https://www.ngmn.org/5g-white-paper-.html.

SUMMARY OF INVENTION

Technical Problem

However, the inventors have realised that there are a number of issues can arise when not every slice type is available in each base station (e.g. due to local load or hardware limitation).

For example, in a sliced RAN, a mobility management entity (MME), or similar NG-core network function, may configure inappropriately a paging/tracking area for a UE to include cells of base stations for which slice types supported by a given UE are unavailable, thereby resulting in paging inefficiencies. Similarly, the MME (or similar NG-core network function) may set roaming and access restrictions inappropriately.

Moreover, for connected mode mobility, following a decision to handover a UE to a target base station based purely on a signal strength, the target base station may attempt to use core network control plane and/or user plane functions that are inappropriate for the slice(s) that the UE is currently using. Furthermore, where on-demand system information in the target base station may not make available all the system information required by the UE to support its slice(s).

There are also many other issues, that have not yet been considered or recognised, which require addressing in order to provide a functional slicing mechanism.

It can be seen, therefore, that there are many issues that need to be addressed in order for significant progress to be made towards provision of a fully working and efficient slicing mechanism.

The present invention seeks to provide apparatus and associated methods that at least partially contribute to the provision of a working slicing mechanism by addressing one or more of these issues.

Notwithstanding the above recognised issues, the inventors have realised that progress can be made towards a working slicing mechanism if a number of as yet unconsidered issues are addressed.

Solution to Problem

In one aspect of the invention there is provided a communication apparatus for a communication system in which network slicing is supported, the communication apparatus comprising: a controller and a transceiver; wherein the controller is configured to: generate a message comprising slice support information indicating at least one slice support capability of the communication apparatus; and control the transceiver to transmit said message to a node of a core network.

In another aspect of the invention there is provided a core node for a core network of a communication system in which network slicing is supported, the core node comprising: a controller and a transceiver; wherein the controller is configured to: control the transceiver to receive, from communication apparatus, a message comprising slice support information indicating at least one slice support capability of the communication apparatus; and configure information stored at the core node based on the slice support information.

In another aspect of the invention there is provided a communication apparatus for a communication system in which network slicing is supported, the communication apparatus comprising: a controller and a transceiver; wherein the controller is configured to: control the transceiver to receive from another communication apparatus, as part of handover procedure for at least one communication device, a message comprising, slice support information relating to at least one slice supported by the at least one communication device; and configure the communication apparatus to support communication of the at least one communication device based on the slice support information by at least one of: selecting appropriate slice specific core network functionality based on the slice support information; and switching on slice specific on-demand system information based on the slice support information.

In another aspect of the invention there is provided a communication apparatus for a communication system in which network slicing is supported, the communication apparatus comprising: a controller and a transceiver; wherein the controller is configured to: control the transceiver to send a message to configure a communication device to perform measurements in respect of at least one neighbour cell of other communication apparatus that supports a slice that the communication device uses, and to receive at least one associated measurement report from the communication device; and select a target for handover based on the at least one associated measurement report.

In another aspect of the invention there is provided a communication apparatus for a communication system in which network slicing is supported, the communication apparatus comprising: a controller and a transceiver; wherein the controller is configured to: control the transceiver to receive from another communication apparatus, as part of procedure for configuring dual connectivity for at least one communication device, a message comprising, slice support information relating to at least one slice supported by the at least one communication device; and configure the communication apparatus for dual connectivity based on the slice support information.

In another aspect of the invention there is provided a communication apparatus for a communication system in which network slicing is supported, the communication apparatus comprising: a controller and a transceiver; wherein the controller is configured to: control the transceiver to receive, from at least one communication device, as part of a connection reestablishment procedure, a connection reestablishment message comprising, slice support information relating to at least one slice supported by that at least one communication device; and configure the communication apparatus to support reestablishment of a connection with the communication device based on the slice support information.

In another aspect of the invention there is provided a communication device for a communication system in which network slicing is supported, the communication device comprising: a controller and a transceiver; wherein the controller is configured to: control the transceiver to transmit, to communication apparatus, as part of a connection reestablishment procedure, a connection reestablishment message comprising, slice support information relating to at least one slice supported by that communication device.

In another aspect of the invention there is provided a communication apparatus for a communication system in which network slicing is supported, the communication apparatus comprising: a controller and a transceiver; wherein the controller is configured to: control the transceiver to receive, from a core node, at least one message comprising, for at least one communication device, slice support information relating to at least one slice used by that at least one communication device; and configure the communication apparatus to support communication of the at least one communication device based on the slice support information.

In another aspect of the invention there is provided a method performed by a communication apparatus in a communication system, the method: generating a message comprising slice support information indicating at least one slice support capability of the communication apparatus; and transmitting said message to a node of a core network.

In another aspect of the invention there is provided a method performed by a core node in a core network in a communication system in which network slicing is supported, the method comprising: receiving, from communication apparatus, a message comprising slice support information indicating at least one slice support capability of the communication apparatus; and configuring information stored at the core node based on the slice support information.

In another aspect of the invention there is provided a method performed by a communication apparatus in a communication system in which network slicing is supported, the method comprising: receiving from another communication apparatus, as part of handover procedure for at least one communication device, a message comprising, slice support information relating to at least one slice supported by the at least one communication device; and configuring the communication apparatus to support communication of the at least one communication device based on the slice support information by at least one of: selecting appropriate slice specific core network functionality based on the slice support information; and switching on slice specific on-demand system information based on the slice support information.

In another aspect of the invention there is provided a method performed by a communication apparatus in a communication system in which network slicing is supported, the method comprising: sending a message to configure a communication device to perform measurements in respect of at least one neighbour cell of other communication apparatus that supports a slice that the communication device uses; receiving at least one associated measurement report from the communication device; and selecting a target for handover based on the at least one associated measurement report.

In another aspect of the invention there is provided a method for a communication apparatus in a communication system in which network slicing is supported, the method comprising: receiving from another communication apparatus, as part of procedure for configuring dual connectivity for at least one communication device, a message comprising, slice support information relating to at least one slice supported by the at least one communication device; and configuring the communication apparatus for dual connectivity based on the slice support information.

In another aspect of the invention there is provided a method performed by a communication apparatus in a communication system in which network slicing is supported, the method comprising: receiving, from at least one communication device, as part of a connection reestablishment procedure, a connection reestablishment message comprising, slice support information relating to at least one slice supported by that at least one communication device; and configuring the communication apparatus to support reestablishment of a connection with the communication device based on the slice support information.

In another aspect of the invention there is provided a method performed by a communication device in a communication system in which network slicing is supported, the method comprising: transmitting, to communication apparatus, as part of a connection reestablishment procedure, a connection reestablishment message comprising, slice support information relating to at least one slice supported by that communication device.

In another aspect of the invention there is provided a method performed by a communication apparatus in a communication system in which network slicing is supported, the method comprising: receiving, from a core node, at least one message comprising, for at least one communication device, slice support information relating to at least one slice used by that at least one communication device; and configuring the communication apparatus to support communication of the at least one communication device based on the slice support information.

Aspects of the invention extend to corresponding systems, methods, and computer program products such as computer readable storage media having instructions stored thereon which are operable to program a programmable processor or system to carry out a method as described in the aspects and possibilities set out above or recited in the claims and/or to program a suitably adapted computer to provide the apparatus recited in any of the claims.

Each feature disclosed in this document (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Whilst specific hardware apparatus having a specific physical structure (e.g. controllers and transceiver circuitry) have been disclosed for performing the various procedures described herein, each step of the methods disclosed in the description and/or forming part of the claims, may be implemented by any suitable means for performing that step. In accordance with this each method aspect of the invention has a corresponding apparatus aspect comprising respective means for performing each step of that method aspect.

Example embodiments of the invention will now be described, by way of example, with reference to the accompanying drawings in which:

BRIEF DESCRIPTION OF DRAWINGS

FIG. 1 schematically illustrates a mobile telecommunication system of a type to which the invention is applicable;

FIG. 2 is a block diagram of physical apparatus for implementing a mobile telephone suitable for use in the telecommunication system of FIG. 1;

FIG. 3 is a block diagram of physical apparatus for implementing a base station suitable for use in the telecommunication system of FIG. 1;

FIG. 4 is a block diagram of physical apparatus for implementing a distributed base station suitable for use in the telecommunication system of FIG. 1;

FIG. 5 is a block diagram of physical apparatus for implementing a core network function suitable for supporting provision of mobility management functions for use in the telecommunication system of FIG. 1;

FIG. 6 is a block diagram of physical apparatus for implementing a core network function suitable for supporting slice selection in the telecommunication system of FIG. 1;

FIG. 7 is a simplified sequence diagram illustrating procedures, performed between a base station and a core network to support configuration of paging areas and/or roaming and access restrictions in the telecommunication system of FIG. 1;

FIG. 8 illustrates how a handover restriction list may be configured by a procedure illustrated in FIG. 7;

FIG. 9 is a simplified sequence diagram illustrating a procedure, that may be performed between user equipment and base stations, for supporting connected mode mobility in the context of network slicing, in the telecommunication system of FIG. 1;

FIG. 10 illustrates how a Handover Request may be configured for use in the procedure illustrated in FIG. 9;

FIG. 11 is a simplified sequence diagram illustrating a procedure that may be performed between base stations of the telecommunication system of FIG. 1, for supporting dual connectivity, in the context of network slicing;

FIG. 12 is a simplified sequence diagram illustrating a procedure that may be performed between user equipment and a base station of the telecommunication system of FIG. 1, for supporting connection reestablishment, in the context of network slicing;

FIG. 13 illustrates how a RRC Connection Reestablishment Request message may be configured for use in the procedure illustrated in FIG. 12;

FIG. 14 is a simplified sequence diagram illustrating procedures that may be performed between a base station and the core network of the telecommunication system of FIG. 1, for supporting various communication processes, in the context of network slicing;

FIG. 15 is a simplified sequence diagram illustrating another procedure that may be performed between a base station and the core network of the telecommunication system of FIG. 1, in the context of network slicing;

FIG. 16 illustrates how different slices/slice types may be supported by different base stations;

FIG. 17 is a simplified block schematic illustrating a possible arrangement of a number of possible slice specific core network functions and the interfaces/reference points between them;

FIG. 18 is a simplified schematic illustrating how 'm' slice types for 'n' tenants and Z UEs may be supported via a radio access network and core network;

FIG. 19 is a simplified schematic illustrating how slices for different UEs communicating via the same RAN may have different sets of slice specific core network functions and/or common control plane network functions; and FIG. 20 is a simplified sequence diagram illustrates a typical connection procedure that may take place in a network comprising a slice selection function (SSF).

DESCRIPTION OF EMBODIMENTS

Overview

FIG. 1 schematically illustrates a mobile (cellular) telecommunication system 1 in which a plurality of differently configured network slices 2 are defined via which a network operator provides cellular services to different tenants based on their service level agreement (SLA). It will be appreciated that with the concept of tenants, a network operator can differentiate different customer requirements and provide customised services using one/many slices. In this example, the mobile telecommunication system 1 operates as a next generation ('5G') system but it will be appreciated that many of the features described with reference to this example are applicable more widely in other communication systems. The base stations 5 each form part of an associated radio access network (RAN) for allowing user equipment (UE) 3 (such as mobile telephones/smartphones 3-1, 3-2, and 3-3, MTC/IoT devices (not shown), and/or other mobile or fixed location communication devices) to connect to their network and receive one or more associated services.

It will be appreciated that whilst FIG. 1 shows what appears to be 'whole network' slices this is purely for illustrative purposes. The core can have its own slice and so can a radio access network RAN. Similarly the control plane (CP) and user plane (UP) can have different slices altogether. Different mapping of RAN Slices to Core Slices can happen depending on standardisation and cellular operator policy.

Each UE 3, in this example, is provided with communication services by at least one tenant having its own unique Tenant ID. Thus with tenant and slice concepts, the network operator is able to provide communication services using one or more types of network slice 2 depending on the communication requirements of each tenant.

A multi-dimensional descriptor (MDD) is configured in each UE 3 which represents at least: a Tenant ID of a tenant it belongs to; and service descriptor/slice type they are entitled to use (governed partly by Tenant ID). The service descriptor/slice types may comprise standardised values and/or operator specific values. The MDD is, in essence, a matrix that indicates in each of its rows a slice 2 the UE 3 may request to access or address (hence if there is a single slice then the MDD is a vector). A row in the MDD is referred to as an MDD vector. An MDD vector has the combined purposes of identifying a tenant (identified by the Tenant ID component), and the network behaviours for the target network service (identified by the Slice Type component—e.g. enhanced Mobile Broadband (eMBB) service, critical communications (CriC), mMTC (massive Machine Type Communications) or other behaviours which may also be operator specific).

Services are provided to each tenant's respective UE(s) 3 via one or more base stations 5-1, 5-2 of the telecommunication system 1. As will be understood by those skilled in the art, each base station 5 operates one or more cells 6-1, 6-2, 6-3 in which communications can be made between the base stations 5 and the UE(s) 3 using an appropriate radio access technology, for example, an Evolved Universal Terrestrial Radio Access (E-UTRA) technology and/or the like.

Each UE 3 may provide respective network slice selection assistance information (NSSAI) consisting of a set of parameters e.g., Network Slice Type ID, service type, and UE capabilities to the network (i.e. via the gNB 5) to allow selection of an appropriate set of RAN (e.g. base station(s) 5) and core network parts (e.g. appropriate core network functions 7) of the network slice instances (NSIs) for that UE.

The base stations are configured to operate in accordance with next generation (5G) standards and, in this example, comprise a non-distributed type gNB 5-1 and a distributed gNB 5-2. As seen in FIG. 1 the distributed gNB 5-2 of this example comprises a central unit (CU) 5-2b and a plurality of distributed units (DU) 5-2a each serving at least one associated cell.

It will be appreciated that whilst, in this example, 'gNB' type base stations are described, it will be appreciated that much of the functionality can be extended to other base stations or similar apparatus for providing radio access to UEs 3 such as mobile (cellular) telephones/smartphones, MTC/IoT devices, and/or other mobile or fixed location communication devices.

The gNBs 5 are connected via an associated core network having a plurality of logical core network nodes 7 for supporting communication in the telecommunication system 1. The core network nodes 7 of this example implement, amongst other functions, at least one control plane (CP) function 7-1, at least one user plane (UP) function 7-2, at least one network slice selection function (SSF) 7-4 and a number of other functions 7-n such as an access management function (AMF), a session management function (SMF), and/or the like. In this example one of the core network nodes 7 may also implement a mobility management function 7-3 which provides mobility management functionality, e.g. corresponding to that of an LTE mobility management entity (MME). It will be appreciated that whilst separate functions with specific names are described for illustrative purposes, the corresponding functionality may be implemented in isolation or combination by one or more suitable core network nodes 7 implemented using dedicated circuitry and/or software instructions for controlling an associated processor. For example the slice selection function 7-4 may be implemented as part of any suitable core network node 7 such as a core node 7 that implements mobility management functionality 7-3.

In this example, the user plane function(s) 7-2 comprise at least one, but typically a plurality of, so-called terminating user plane function(s) (TUPF(s)) for terminating user plane traffic and interfacing with a data network. By way of supporting background, 3GPP technical report (TR) 23.799 V0.7.0 introduces the concept of the TUPF which is effectively a logical network node coupled to one or more cells (gNBs). It is assumed that an appropriate protocol data unit (PDU) session is provided between the TUPF and each connected UE 3 (i.e. UEs served by base stations coupled to that TUPF).

To allow a particular UE 3 to know, as early as possible, whether that UE's allowed Tenant ID(s) and/or slice type(s) are supported within a particular cell, information identifying the supported Tenant ID(s), slice type (per Tenant ID) and TUPF 7-2 are broadcast in system information (for example in a system information block, 'SIB', such as SIB2 in LTE) by the corresponding gNB 5. The UE 3 can then listen to the relevant SIB for the purpose of checking whether a given cell supports a particular desired Tenant ID, slice type per Tenant ID and/or TUPF. Support for a particular desired Tenant ID, slice type per Tenant ID and/or TUPF can be checked based on the MDD, the UE capabilities and/or the USIM configuration. When the UE 3 identifies that its desired Tenant IDs, slice types per Tenant ID and TUPF are supported by a cell 6 based on the system information broadcast by the gNB 5, the UE 3 can then camp on the cell 6 for any of a number of different purposes (for example for an initial access procedure or for requesting a service).

Accordingly, a gNB 5 is able to dynamically change the Tenant IDs, slice types per Tenant ID and/or TUPF supported in a particular cell 6 (e.g. based on operator requirements, demand, or the like) and the UE 3 is able to identify whether its allowed Tenant ID(s) and/or slice type(s) are supported within that cell 6.

The system information (SI) comprises minimum system information (e.g. including a subset of system information blocks (SIBs) such as a master information block (MIB), SIB1, SIB2 and SIB14) carrying a 'minimum' set of information elements (e.g. those elements required to support cell selection, acquiring other system information (OSI), or accessing the cell). The system information also comprises OSI that comprises all the system information in the other SIBs typically available in a telecommunication system. The minimum system information is transmitted on a regular periodic basis whereas the OSI may be broadcast in a periodic manner or may be broadcast/unicast on-demand.

Beneficially, in exemplary methods described in more detail later, the telecommunications system illustrated in FIG. 1 provides a number of procedures that may be performed between a base station 5 of the type shown in the telecommunications system of FIG. 1, and the core network 7, for supporting efficient configuration of paging areas and/or roaming and access restrictions.

Beneficially, in exemplary methods described in more detail later, the telecommunications system illustrated in FIG. 1 also provides a number of procedures, that may be performed between different base stations 5 of the types shown in the telecommunications system of FIG. 1, for supporting connected-mode mobility, the setting up of dual mode connectivity, and connection re-establishment, in the context of network slicing.

Beneficially, in exemplary methods described in more detail later, the telecommunications system illustrated in FIG. 1 also provides a number of procedures that may be performed between a base station of the type shown in the telecommunications system of FIG. 1, and the core network 7, for supporting UE context setup and modification, connected-mode mobility, efficient paging and slice selection.

User Equipment

FIG. 2 is a block diagram illustrating the main components of user equipment (such as a mobile telephone) 3 shown in FIG. 1. As shown, the UE 3 has a transceiver circuit 231 that is operable to transmit signals to and to receive signals from a base station (e.g. a gNB) 5 via one or more antennae 233. Although not necessarily shown in FIG. 2, the UE 3 may of course have all the usual functionality of a conventional UE 3 (such as a user interface 235) and this may be provided by any one or any combination of hardware, software and firmware, as appropriate. The UE 3 has a controller 237 to control the operation of the user equipment 3.

The controller 237 is associated with a memory 239 and is coupled to the transceiver circuit 231. Software may be pre-installed in the memory 239 and/or may be downloaded via the telecommunications network or from a removable data storage device (RMD), for example.

The controller 237 is configured to control overall operation of the UE 3 by, in this example, program instructions or software instructions stored within the memory 239. As shown, these software instructions include, among other things, an operating system 241, a communications control module 243, a slice/tenant information module 245, a radio resource control (RRC) entity 247, a medium access control (MAC) entity 249, a physical layer (PHY) entity 251, a non-access stratum (NAS) module 252, and a measurement module 253.

The memory 239 also includes configuration information 255 used by the UE 3 for communication and control purposes. This information typically includes, amongst other things, the multi-dimensional descriptor (MDD) (when configured for the UE 3), information identifying the UE's communication and other capabilities and information identifying how the UE's subscriber identity module (SIM), for example a universal SIM (USIM), or the like, is configured.

The communications control module 243 is operable to control the communication between the UE 3 and the base stations 5 shown in FIG. 1. The communications control module 243 also controls the separate flows of uplink data and control data that are to be transmitted to the base station 5 and the reception of downlink data and control data transmitted by the base station(s) 5. The communications control module 243 is responsible, for example, for managing the UE's part in idle and connected mode procedures such as cell (re)selection, camping on cells, listening for system information, random access channel (RACH) procedures, etc.

The slice/tenant information module 245 is responsible for managing and maintaining information identifying the tenant(s) to which the UE 3 belongs and the information identifying slice(s)/slice type(s) that the UE 3 is capable of using.

The RRC entity 247 is responsible for controlling the RRC layer functionality of the UE 3 (under the overall control of the communications control module 243). The MAC entity 249 is responsible for controlling the MAC layer functionality of the UE 3 (under the overall control of the communications control module 243). The PHY entity 251 is responsible for controlling the physical layer functionality of the UE 3 (under the overall control of the communications control module 243). The NAS module 252 is responsible for controlling the NAS functionality of the UE 3 (under the overall control of the communications control module 243).

The measurement module 253 handles the performance of measurements of communication conditions (e.g. received signal power and quality) in the serving and neighbouring cells (e.g. based on measurement configuration and control information received from the base station 5). The measurement module 253 also generates associated measurement reports for transmission to the base station 5.

Non-Distributed Base Station (gNB)

FIG. 3 is a block diagram illustrating the main components of a non-distributed type gNB 5-1 of the type shown in FIG. 1. As shown, the gNB 5-1 includes transceiver circuitry 351 which is operable to transmit signals to and to receive signals from UEs 3 via one or more antennae 353 and which is operable to transmit signals to and to receive signals from the functions of the core network 7 and/or other gNBs 5 via a network interface 355. The network interface 355 typically includes an S1-like interface for communicating with the core network and a gNB to gNB (e.g. X2-like) interface for communicating with other gNBs. A controller 357 controls the operation of the transceiver circuitry 351 in accordance with software stored in a memory 359. The software includes, among other things, an operating system 361, a communications control module 363 and a network slice/tenant management module 364.

The communications control module 363 is operable to control the communication between the gNB 5-1 and the UEs 3 and other network entities that are connected to the gNB 5-1. The communications control module 363 also controls the separate flows of uplink and downlink user traffic and control data to be received from and to be transmitted to the communications devices served by gNB 5-1 including, for example, control data for managing operation of the UEs 3. The communications control module 363 is responsible, for example, for controlling procedures such as the communication of measurement control/configuration information, system information (on-demand and periodic), the gNB's part in random access channel (RACH) procedures, etc. The communications control module 363 is also responsible for managing the gNBs part in the setup, configuration and reconfiguration of gNB to gNB interfaces with neighbouring gNBs and in the setup, configuration and reconfiguration of gNB to core network interfaces with core network nodes 7 (such as the mobility management function 7-3). The communications control module 363 is also responsible for managing the gNB's part in handover (both gNB to gNB interface based and gNB to core network interface based) including making handover decisions, selecting targets, etc. (where applicable). The communications control module 363 is also responsible for managing the gNB's part in UE context setup and modification procedures, dual connectivity (e.g. operation as a master or a secondary gNB, the addition and management of secondary gNBs, etc.), connection (re)establishment procedures with a UE 3, and paging procedures.

The network slice/tenant management module 364 is operable to store and manage configuration data 365 for defining, for each service/tenant, the various radio access network (RAN) slices available via the gNB 5-1.

Distributed Base Station (gNB)

FIG. 4 is a block diagram illustrating the main components of a distributed type gNB 5-2 of the type shown in FIG. 1. As shown, the gNB 5-2 includes a distributed unit 5-2a and a central unit 5-2b. Each unit 5-2a, 5-2b includes respective transceiver circuitry 451a, 451b. The distributed unit 5-2a transceiver circuitry 451a is operable to transmit signals to and to receive signals from UEs 3 via one or more antennae 453a and is operable to transmit signals to and to receive signals from the central unit 5-2b via an interface 454a.

The central unit 5-2b transceiver circuitry 451b is operable to transmit signals to and to receive signals from functions of the core network 7 and/or other gNBs 5 via a network interface 456b. The network interface 456b typically includes an S1-like interface for communicating with the core network and a gNB to gNB (e.g. X2-like) interface for communicating with other gNBs. The central unit 5-2b transceiver circuitry 451b is also operable to transmit signals to and to receive signals from one or more distributed units 5-2b via an interface 454b.

Each unit 5-2a, 5-2b includes a respective controller 457a, 457b which controls the operation of the corresponding transceiver circuitry 451a, 451b in accordance with software stored in the respective memories 459a and 459b of the distributed unit 5-2a and the central unit 5-2b. The software of each unit includes, among other things, a respective operating system 461a, 461b, a respective communications control module 463a, 463b, a respective network slice/tenant management module 464a, 464b, and a respective DU/CU functional split management module 467a, 467b.

Each communications control module 463a, 463b, is operable to control the communication of its corresponding unit 5-2a, 5-2b including the communication from one unit to the other. The communications control module 463a of the distributed unit 5-2a controls communication between the distributed unit 5-2a and the UEs 3, and the communications control module 463b of the central unit 5-2b controls communication between the central unit 5-2b other network entities that are connected to the gNB 5-2.

The communications control modules 463a, 463b also respectively control the part played by the distributed unit 5-2a and central unit 5-2b in the flow of uplink and downlink user traffic and control data to be transmitted to the communications devices served by gNB 5-2 including, for example, control data for managing operation of the UEs 3. Each communication control module 463a, 463b is responsible, for example, for controlling the respective part played by the distributed unit 5-2a and central unit 5-2b in procedures such as the communication of measurement control/configuration information, system information (on-demand and periodic), the gNBs part in random access channel (RACH) procedures, etc. Each communication control module 463a, 463b is also responsible, for example, for controlling the respective part played by the distributed unit 5-2a and central unit 5-2b in managing the gNBs part in the setup, configuration and reconfiguration of gNB to gNB interfaces with neighbouring gNBs and in the setup, configuration and reconfiguration of gNB to core network interfaces with core network nodes 7 (such as the mobility management function 7-3). Each communication control module 463a, 463b is also responsible, for example, for controlling the respective part played by the distributed unit 5-2a and central unit 5-2b in managing the gNBs part handover including making handover decisions, selecting targets, etc. (where applicable). Each communication control module 463a, 463b is also responsible, for example, for controlling the respective part played by the distributed unit 5-2a and central unit 5-2b in managing the gNB's part in UE context setup and modification procedures, dual connectivity (e.g. operation as a master or a secondary gNB, the addition and management of secondary gNBs, etc.), connection (re)establishment procedures with a UE 3, and paging procedures.

Each network slice/tenant management module 464a, 464b is operable to perform the respective part played by the distributed unit 5-2a and central unit 5-2b in storing and managing configuration data for defining, for each service/tenant, the various radio access network (RAN) slices available via the gNB 5-2.

Each DU/CU functional split management module 467a, 467b is responsible for the respective part played by the distributed unit 5-2a and central unit 5-2b in managing, configuring, and reconfiguring the functional split between the distributed unit 5-2a and central unit 5-2b.

Mobility Management Function

FIG. 5 is a block diagram illustrating the main components of a core node 7 that provides a mobility management function 7-3 (e.g. a mobility management entity (MME)). The core node 7-3 comprises transceiver circuitry 571 which is operable to transmit signals to and to receive signals from the gNBs 5 and/or other nodes (e.g. other core nodes providing other core network functions) via a network interface 575. A controller 577 controls the operation of the transceiver circuitry 571 in accordance with software stored in a memory 579. The software includes, among other things, an operating system 581, a communications control module 583 and a mobility management module 584.

The communications control module 583 is operable to control direct and/or indirect communication between the core node 7-3 and other network entities (e.g. the gNBs 5 and other core nodes 7 providing other core network functions) that are connected (directly or indirectly) to the core node 7-3.

The mobility management module 584 is responsible for providing the mobility management functionality of the core node 7 including, for example, control for the radio access network, idle mode UE paging, bearer activation/deactivation functions, selection of an appropriate core node 7 (e.g. serving gateway and/or TUPF) for a UE 3 at initial attach and at time of handover involving core node relocation. It is also responsible for authenticating a user, non-access stratum (NAS) signalling termination, generation and allocation of temporary identities to UEs and other such functions.

Slice Selection Function

FIG. 6 is a block diagram illustrating the main components of a core node 7 that provides a slice selection function 7-4. The core node 7-4 comprises transceiver circuitry 671 which is operable to transmit signals to and to receive signals from the gNBs 5 and/or other nodes (e.g. other core nodes providing other core network functions) via a network interface 675. A controller 677 controls the operation of the transceiver circuitry 671 in accordance with software stored in a memory 679. The software includes, among other things, an operating system 681, a communications control module 683, and a slice selection management module 684.

The communications control module 683 is operable to control direct and/or indirect communication between the core node 7-4 and other network entities (e.g. the gNBs 5 and other core nodes 7 providing other core network functions) that are connected (directly or indirectly) to the core node 7-4.

The slice selection management module 684 is responsible for providing the slice selection related functionality of the core node 7-4 including, for example, in response to a UE's initial attach request and/or new session establishment request, to select an appropriate slice for the UE 3.

Other Functions

Whilst not described in detail it will be appreciated that the other core network functions (e.g. AMF and SMF) can be implemented in a similar manner to those shown in FIGS. 5 and 6 by means of appropriate transceiver circuitry for transmitting signals to and receiving signals from the gNBs 5 and/or other nodes (e.g. other core nodes 7 providing other core network functions), and a controller for controlling the operation of the transceiver circuitry in accordance with software stored in memory. The software would typically include among other things, an operating system, a communications control module, and other modules specific to the functionality of that core network function.

In the above description, the mobile telephone, the UE 3, gNBs 5 and core network nodes 7 implementing the core network functions are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of procedures will now be described, by way of example only, which may be implemented to help provide an efficient slicing mechanism having a number of benefits. It will be appreciated that whilst each of these procedures may provide technical benefits independently when implemented in isolation, any combination of these procedures may be implemented together.

Configuration of Paging Areas and Roaming and Access Restrictions

FIG. 7 illustrates procedures that may be performed between a base station of the type shown in the telecommunications system of FIG. 1, and a core network node 7 (e.g. the mobility management function 7-3, to support efficient configuration of paging areas and/or roaming and access restrictions in the context of network slicing.

In the procedures of FIG. 7, the core network node 7 obtains information for assisting configuration of a paging area and/or handover restriction list from a gNB 5. This information comprises information identifying hardware capabilities and/or information identifying a list of NSTs that can be supported by the gNB 5, together with information identifying a tracking area and/or paging area (e.g. a tracking area code (TAC) and/or RAN paging area code). From this information, the core network node 7 can identify slice support and configure paging areas and/or roaming and access restrictions accordingly for a UE while considering UE capabilities, SLA in terms of Slice Support, tenant type.

In the procedure of FIG. 7(a), the information for assisting configuration of a paging area and/or handover restriction list is obtained during a gNB-core network interface setup procedure (e.g. an S1 setup procedure or NG-C setup procedure). Specifically, the gNB 5 provides, at S700, the information to the core network node 7 in an interface setup request (e.g. an S1 setup request or NG-C setup request). The core network node 7 sets up the interface accordingly and, assuming interface setup is successful, responds with an appropriate interface setup response message at S702.

Beneficially, RAN-core slice mapping details can be provided by the core network node 7 (e.g. AMF/mobility management function) in the interface setup response message. This slice mapping information may be used by the base station 5 when implementing a NAS (Non Access Stratum) node selection function, or a similar process, to select one or more specific CN nodes to which initial NAS signalling messages are routed.

In the procedure of FIG. 7(b), the information for assisting configuration of a paging area and/or handover restriction list is obtained during a base station Configuration Update procedure (e.g. an cNB/gNB/NR-BS setup procedure). Specifically, the gNB 5 provides, at S704, the information to the core network node 7 in an eNB/gNB/NR-BS Configuration Update message. The core network node 7 updates the eNB/gNB/NR-BS configuration accordingly and, assuming CNB/gNB/NR-BS configuration update is successful, responds with an appropriate eNB/gNB/NR-BS Configuration Update Acknowledge message at S706 while optionally including core-RAN Slice mapping details.

Regardless of how the core network node 7 obtains the information, the core network function 7 can thus configure a paging area for a given UE 3 based on supported slice types of that UE 3 and of the gNBs 5 from which the information has been received (as shown at S708).

In order to optimise paging such that paging is only carried out in cells that support slice types supported by a UE 3 that is being paged, when a paging message sent to a gNB 5 in a tracking area associated with the paged UE (e.g. as illustrated at S710), the paging message (paging request) can include an assistance data for paging information element (IE) that identifies which cells should (and/or possibly should not) be paged (e.g. in a recommended cells IE or similar IE). Thus, as indicated, the information can beneficially be provided as part of Assistance Data for Paging passed on to a base station (eNB/gNB) by a core network entity (e.g. a mobility management function/MME) in a paging request.

Regardless of how the core network node 7 obtains the information, the core network function 7 can also configure a handover restriction list for a given UE 3 to identify forbidden tracking area(s), location area(s) and/or cells. The configuration may be based on the UE's service level agreement, UE capabilities, supported slice types of that UE 3 and of the gNBs 5 from which the information has been received (as shown at S712).

As shown at S714, the handover restriction list for a given UE 3, once configured, can be sent to a gNB 5 to which that UE 3 is connecting in an initial context setup request message from the core network node 7, during an initial context setup procedure for that UE 3. As shown at S714, the handover restriction list for a given UE 3, once configured, can also be sent to a gNB 5, to which that UE is handing over (e.g. a target gNB), in a Handover Request message from the core network node 7, during a handover procedure (e.g. a gNB-core network interface based handover procedure).

For completeness, it will be appreciated that configuration by an operations, administration and management (OAM) function is also possible in terms of network availability of the slice types configured where the UE is allowed to be registered.

As shown at S716, the core network node 7 can also configure one or more allowed cell lists (ACLs) based on eNB/gNB capability information with respect to the slice support information gathered through a signalling mechanism described above (or the OAM-based configuration). Specifically the core network node 7 (e.g. mobility management function/AMF) can configure the ACL(s) per tracking area and/or per RAN Routing Area for each UE 3 based UE capabilities, SLA requirements in terms of slice support and Tenant ID. The configured ACL(s) may be included in initial context setup request message sent by the core network node 7 (e.g. at the time of a service request and/or tracking area update (TAU)). Configuring per TA and/or RAN Routing Area beneficially limits the number of cells included in the ACL(s). Thus, a UE 3 can camp on those cells identified in a corresponding ACL and the need to broadcast supported slice type, tenant type by each base station can be avoided or at least minimised.

FIG. 8 illustrates, by way of example, how a Handover Restriction List may be configured to enable handover to be restricted, at a cell granularity level (i.e. rather than at a TA granularity level), based on slice types supported by a cell, gNB 5 and/or tracking area, UE SLA and/or UE Capabilities. Specifically, the Handover Restriction List is configured to include a forbidden cell-list 800 in the form of a list of base station/cell identifiers (e.g. a global eNB ID (or equivalent gNB ID) with an associated list of E-UTRAN cell global identifiers (or equivalent 5G/NG cell identifiers)).

When handover is required, a source gNB 5 (e.g. the gNB which is serving the UE 3) can therefore beneficially select a target gNB based, at least partially, on the forbidden cell-list 800 in the handover restriction list.

It will be appreciate that whilst, in legacy LTE systems, all eNBs are identical from an MME perspective, and this changes when slicing is employed. Configuring the Handover Restriction List at a cell level granularity (as opposed to TA level access restriction) beneficially enables the gNB to gNB differences caused by slicing to by understood at the gNB and to be catered for in the system.

Support for Connected-Mode Mobility (gNB to gNB Interface Based)

FIG. 9 illustrates a procedure, that may be performed between user equipment 3 and base stations 5 of the type shown in the telecommunications system of FIG. 1, for supporting gNB to gNB interface based mobility in the context of network slicing.

In the example of FIG. 9, a (source) gNB (A) configures the UE 3 to perform appropriate neighbour cell measurements for neighbour gNBs such as gNB (B) (and possibly the serving gNB) using an appropriate Measurement Control message sent at S900. It will be appreciated that a source base station can limit the number of target candidates, to those that support slices a UE in question is interested in, for measurement purposes. A source can gather hardware and slice support capabilities of a target by exchanging such information at a time of X2/Xn setup or periodic eNB configuration update. The UE 3 performs the configured measurements at S901 and reports the measurements in at least one Measurement Report message at S902. It will be appreciated that this mechanism can be extended to allow gNBs 5 to acquire and exchange neighbour gNB information in terms of any tenant/slice types that are supported and/or any hardware/frequency-specific slices.

gNB (A) then makes a decision on handover. In this example, gNB (A) selects a target gNB (e.g. gNB (B)), as illustrated at S904, based purely on the signal strength measurement results. However, by limiting the number of target candidates, to those that support slices a UE in question is interested in, the selected target will be a gNB that does support a preferred slice type. When a decision has been made, gNB (A) then sends, at S906, a handover request to the selected target gNB (B) 5. This handover request message beneficially includes slice usage information identifying the slice types used by a UE 3. In this example, the slice usage information comprises a slice identifier (which may also be referred to as a 'slice type identifier') that represents a specific NST for each slice in use. The slice usage information may also comprise other information such as information identifying one or more next generation core network control plane functions (NG-C CP NF) (e.g. by way of an appropriate common control network function (CCNF) ID). As illustrated in FIG. 9, the core network functions identified may include one or more AMFs (e.g. identified by AMF ID), information identifying one or more SMFs (e.g. identified by SMF ID), and/or one or more user plane functions (e.g. identified by UPF ID) associated with the slice (e.g. where AMF, SMF and UPF are slice specific). The handover request message also beneficially includes an associated MDD (i.e. Tenant ID and/or slice type) and/or network slice selection assistance information (NSSAI) including, for example, UE capability information, a service type associated with the slice, and possibly the requested service. The handover request message also includes information identifying the target gNB 5 (gNB (B) in this example) and/or target cell.

Beneficially, at S908, the target gNB 5 (gNB (B)) will use the received information to select slice specific control plane and user plane network functions (e.g. the correct CCNF)—this may be subject to admission control by a target for a given UE while considering its SLA requirements and current load. Beneficially, when on-demand system information is enabled, the target gNB 5 (gNB (B)) may, at S910, also use the received information to identify if any slice specific system information needs to be made available and, if so, to switch that slice specific system information on.

The gNB (B) 5 responds, at S912, to the handover request message with a handover acknowledge message (which will typically include the handover command to be sent to the UE 3 by the source gNB (A) 5 to initiate handover).

The rest of the handover process may proceed (e.g. at S914) in accordance with procedures that those skilled in the art will be familiar with and, for reasons of brevity, will not be described in detail.

FIG. 10 illustrates, by way of example, how a handover request message may be configured to provide the slice usage and related information. Specifically, as seen in FIG. 10 at 1000, the handover request message is configured to include an MDD information element (IE) comprising the MDD vector(s) for the UE 3 to allow customer type, Tenant id and service level agreement to be identified, a UE temporary identifier IE comprising information for identifying the UE 3 (typically uniquely for a specific AMF and/or gNB), and a slice usage list IE. The slice usage list IE comprises, for each slice used by the UE 3, a respective Slice Type (NST) ID IE for providing a slice ID representing the associated NST of that slice, and a respective NG-C CP NF ID information element (e.g. identifying an appropriate common control network function (CCNF) ID) comprising a respective identifier for each relevant network function (e.g. an AMF ID, SMF ID and/or UPF ID) associated with that slice.

Moreover, as indicated in FIG. 10, the Handover Request can include a quality of service (QoS) flow ID information element identifying an associated traffic flow associated with a particular quality of service (QOS) and including, for example, downlink forwarding information and information identifying an uplink GPRS tunnelling protocol (GTP) tunnel endpoint for the QoS flow. Whilst the Slice ID will indicate a coarse-granular QoS, the inclusion of the QoS IE beneficially provides an indication of a fine-granular QoS that can be derived for the MDD.

Beneficially, therefore, a target gNB 5 is able to know exactly what slice types a UE 3 is using out of those the UE has subscribed to and can therefore beneficially determine what communication behaviour is required by the UE 3 for the slices that the UE subscribes to, and uses, based on the relevant SLA, and can hence select core network functionality 7 (e.g. a slice specific SMF, AMF, UPF and/or common control plane function) accordingly (that may be subject to local admission control and network-wide policy in terms of how to handle of a UE belonging to a given tenant ID). Moreover, this enables common or slice specific authorisation procedures to be employed.

The presence of Slice ID and MDD in the handover request message also provides for improved admission control and load management. This is possible because the provision of MDD and Slice ID information enables the network to determine how many UEs of a particular tenant can access a particular slice, at a given time instance (e.g. in when an SLA has a maximum limit imposed).

Support for Dual Connectivity

FIG. 11 illustrates a procedure that may be performed between base stations 5 of the type shown in the telecommunications system of FIG. 1, for supporting dual connectivity, in the context of network slicing, in which a so-called 'master' base station (MeNB/MgNB) provides overall control and provides a subset of communication support for the UE 3 (e.g. control plane communication and/or some user plane communication) and a so-called 'secondary' base station (SeNB/SgNB) provides other communication support for the UE (e.g. some/all user plane communication).

As seen in the example of FIG. 11, at S1100 a message (a SeNB/SgNB addition request message in the example) is sent from a first base station 5 (gNB (A) in this example) to a second base station 5 (gNB (B) in this example) to request gNB (B) 5 to allocate resources for dual connectivity operation for a specific UE. The message, in effect, requests setup of dual connectivity for the specific UE, in which gNB (A) 5 is configured as a master gNB and gNB (B) 5 is configured as a secondary gNB.

The SeNB/SgNB addition request message includes slice usage information identifying the slice types used by a UE 3. In this example, the slice usage information comprises a slice identifier (which may also be referred to as a 'slice type identifier') that represents a specific NST for each slice in use. The slice usage information may also comprise other information such as information identifying one or more next generation core network control plane functions (NG-C CP NF) (e.g. by appropriate common control network function (CCNF) ID). As illustrated in FIG. 11, the core network functions identified may include one or more AMFs (e.g. identified by AMF ID), information identifying one or more SMFs (e.g. identified by SMF ID), and/or one or more user plane functions (e.g. identified by UPF ID) associated with the slice (e.g. where AMF, SMF and UPF are slice specific). The SeNB/SgNB addition request message also beneficially includes an associated MDD (i.e. Tenant ID and/or slice type) and/or network slice selection assistance information (NSSAI) including, for example, UE capability information, a service type associated with the slice, and possibly the requested service.

Beneficially, gNB (B) 5 will set up dual connectivity, using the received information, for example to select slice specific user plane network functions, etc.

The gNB (B) 5 responds, at S1102, to the SeNB/SgNB addition request message with an appropriate acknowledge message (e.g. an SeNB/SgNB addition request acknowledge message).

Support for Connection Re-Establishment

FIG. 12 illustrates a procedure, that may be performed between user equipment 3 and a base station 5 of the type shown in the telecommunications system of FIG. 1, for supporting connection reestablishment.

As seen in the example of FIG. 12, at S1200 a message (a RRC connection reestablishment request message in the example) is sent from a UE 3 to a base station 5 to re-establish a connection. The base station 5 responds with an appropriate message (e.g. an RRC connection reestablishment message) at S1202. To complete the connection reestablishment the UE 3 the sends an appropriate completion message (a RRC connection reestablishment complete in the Figure).

The RRC connection reestablishment request (FIG. 12(a)) or RRC connection reestablishment complete message (FIG. 12(b)) includes a slice identifier (which may be sent with or form part of network slice selection assistance information (NSSAI)) and an associated Tenant ID (which may form part of an MDD vector).

Beneficially, base station 5 will thus be able to re-establish the requested connection, using the received information.

FIG. 13 illustrates, at 1300, by way of example, how an RRC connection reestablishment request message may be configured to provide the slice identifier and an associated Tenant ID in the case where RRC connection reestablishment request is extended to include the slice and tenant specific information.

Base Station—Core Network Procedures

FIGS. 14 and 15 illustrate a number of procedures that may be performed between a base station 5 and the core network node 7 of the telecommunications system of FIG. 1, for supporting various communication processes, in the context of network slicing.

FIG. 14(a) illustrates a procedure, that may be performed over a base station 5 to core network node 7 interface (e.g. an S1-like or NG-C interface) for supporting the setup of an initial UE context.

As seen in FIG. 14(a) when a context needs to be configured for a UE 3, a core network node 7 (e.g. a mobility management function 7-3 or any other CN function as described herein) initiates a context setup procedure by sending an appropriate message (an initial context setup request message in this example) to the base station 5 at S1400.

The initial context setup request message includes slice usage information identifying the slice types used by a UE 3. In this example, the slice usage information comprises a slice identifier (which may also be referred to as a 'slice type identifier') that represents a specific NST for each slice in use. The slice usage information may also comprise other information such as information identifying one or more next generation core network control plane functions (NG-C CP NF) (e.g. by appropriate common control network function (CCNF) ID). As illustrated, the core network functions identified may include one or more AMFs (e.g. identified by AMF ID), information identifying one or more SMFs (e.g. identified by SMF ID), and/or one or more user plane functions (e.g. identified by UPF ID) associated with the slice (e.g. where AMF, SMF and UPF are slice specific). The initial context setup request message also beneficially includes an associated MDD (i.e. Tenant ID and/or slice type) and/or network slice selection assistance information (NSSAI) including, for example, UE capability information, a service type associated with the slice, and possibly the requested service.

The base station 5 uses the slice usage and other related information provided in the initial context setup request message in the setup of an initial context for the UE 3 and responds with an appropriately formatted response message (an initial context setup response message in this example) at S1402.

FIG. 14(b) illustrates a procedure, that may be performed over a base station 5 to core network node 7 interface (e.g. an S1-like or NG-C interface) for supporting the modification of a UE context.

As seen in FIG. 14(b) when a context needs to be modified for a UE 3, a core network node 7 (e.g. a mobility management function 7-3 or any other CN function as described herein) initiates a context modification procedure by sending an appropriate message (a UE context modification request message in this example) to the base station 5 at S1404.

The UE context modification request message includes slice usage information identifying the slice types used by a UE 3. In this example, the slice usage information comprises a slice identifier (which may also be referred to as a 'slice type identifier') that represents a specific NST for each slice in use. The slice usage information may also comprise other information such as information identifying one or more next generation core network control plane functions (NG-C CP NF) (e.g. by appropriate common control network function (CCNF) ID). As illustrated, the core network functions identified may include one or more AMFs (e.g. identified by AMF ID), information identifying one or more SMFs (e.g. identified by SMF ID), and/or one or more user plane functions (e.g. identified by UPF ID) associated with the slice (e.g. where AMF, SMF and UPF are slice specific). The UE context modification request message also beneficially includes an associated MDD (i.e. Tenant ID and/or slice type) and/or network slice selection assistance information (NSSAI) including, for example, UE capability information, a service type associated with the slice, and possibly the requested service.

The base station 5 uses the slice usage and other related information provided in the UE context modification request message in the modification of the UE context for the UE 3 and responds with an appropriately formatted response message (a UE context modification response message in this example) at S1406.

FIG. 14(c) illustrates a procedure, that may be performed over a base station 5 to core network node 7 interface (e.g. an S1-like or NG-C interface) for supporting a RAN-CN interface based handover (e.g. an S1-like handover).

As seen in FIG. 14(c) when a handover is required for a UE, a core network node 7 (e.g. a mobility management function 7-3 or any other CN function as described herein) requests handover to a base station 5 (i.e. a selected target gNB) by sending an appropriate message (a handover request message in this example) to the base station 5 at S1408.

The handover request message includes slice usage information identifying the slice types used by a UE 3. In this example, the slice usage information comprises a slice identifier (which may also be referred to as a 'slice type identifier') that represents a specific NST for each slice in use. The slice usage information may also comprise other information such as information identifying one or more next generation core network control plane functions (NG-C CP NF) (e.g. by appropriate common control network function (CCNF) ID). As illustrated, the core network functions identified may include one or more AMFs (e.g. identified by AMF ID), information identifying one or more SMFs (e.g. identified by SMF ID), and/or one or more user plane functions (e.g. identified by UPF ID) associated with the slice (e.g. where AMF, SMF and UPF are slice specific). The handover request message also beneficially includes an associated MDD (i.e. Tenant ID and/or slice type) and/or network slice selection assistance information (NSSAI) including, for example, UE capability information, a service type associated with the slice, and possibly the requested service.

The base station 5 uses the slice usage and other related information provided in the handover request message in the handover process (e.g. in the manner described with reference to FIG. 9 by selecting appropriate core network UP and CP functionality and/or switching on system information as appropriate) and responds with an appropriately formatted response message (an handover acknowledge message in this example) at S1410.

FIG. 14(d) illustrates a procedure, that may be performed over a base station to core network node 7 interface (e.g. an S1-like or NG-C interface) for supporting a gNB-gNB interface based handover (e.g. an X2-like handover).

As seen in FIG. 14(d), at S1412, during gNB-gNB interface based handover of a UE 3 (e.g. as described generally with reference to FIG. 9), a base station 5 (i.e. a selected target gNB) sends a core network node 7 (e.g. a mobility management function 7-3 or any other CN function as described herein) a path switch request message during the handover process (e.g. during the procedure represented at S914 in FIG. 9). The core network node 7 responds by sending a path switch acknowledge message to the base station 5 at S1414.

The path switch acknowledge message includes slice usage information identifying the slice types used by a UE 3. In this example, the slice usage information comprises a slice identifier (which may also be referred to as a 'slice type identifier') that represents a specific NST for each slice in use. The slice usage information may also comprise other information such as information identifying one or more next generation core network control plane functions (NG-C CP NF) (e.g. by appropriate common control network function (CCNF) ID). As illustrated, the core network functions identified may include one or more AMFs (e.g. identified by AMF ID), information identifying one or more SMFs (e.g. identified by SMF ID), and/or one or more user plane functions (e.g. identified by UPF ID) associated with the slice (e.g. where AMF, SMF and UPF are slice specific). The path switch acknowledge message also beneficially includes an associated MDD (i.e. Tenant ID and/or slice type) and/or network slice selection assistance information (NSSAI) including, for example, UE capability information, a service type associated with the slice, and possibly the requested service.

It will be appreciated that the provision of slice usage and other related information provided in the path switch acknowledge message may be done in addition to, or as an alternative to, placing the information in a handover request message as described with reference to FIG. 9.

The base station 5 uses the slice usage and other related information provided in the path switch acknowledge message in the handover process (e.g. in the manner described with reference to FIG. 9 by selecting appropriate core network UP and CP functionality and/or switching on system information as appropriate).

FIG. 14(e) illustrates a procedure, that may be performed over a base station to core network interface (e.g. an S1-like or NG-C interface) for supporting a paging procedure.

As seen in FIG. 14(e), when paging is required to contact a UE 3, a core network node 7 (e.g. a mobility management function 7-3 or any other CN function as described herein) by sending an appropriate message (a paging message in this example) to the base station 5 at S1416 to cause the base station 5 to page for the UE 3 in the cell(s) supporting the required slices and tenant ID indicated that the base station 5 operates.

The paging message includes slice usage information identifying the slice types used by a UE 3 (paged and/or paging). In this example, the slice usage information comprises a slice identifier (which may also be referred to as a 'slice type identifier') that represents a specific NST for each slice in use. The slice usage information may also comprise other information such as information identifying one or more next generation core network control plane functions (NG-C CP NF) (e.g. by appropriate common control network function (CCNF) ID). As illustrated, the core network functions identified may include one or more AMFs (e.g. identified by AMF ID), information identifying one or more SMFs (e.g. identified by SMF ID), and/or one or more user plane functions (e.g. identified by UPF ID) associated with the slice (e.g. where AMF, SMF and UPF are slice specific). The paging message also beneficially includes an associated MDD (i.e. Tenant ID and/or slice type) and/or network slice selection assistance information (NSSAI) including, for example, UE capability information, a service type associated with the slice, and possibly the requested service.

FIG. 15 is a simplified sequence diagram illustrating a slice update procedure that may be performed between a base station 5 and a core network node 7 of the telecommunications system of FIG. 1, in the context of network slicing.

In the procedure of FIG. 15, a core network node (e.g. Mobility Management function, AMF, SMF or the like) provides a slice ID and/or Tenant ID to a base station 5 (e.g. a target gNB before or after mobility) using a dedicated 'slice update' procedure.

As seen in the example of FIG. 15, at S1500 an appropriate message (a slice update request message in the example) is sent from the core network node 7 to a base station 5. The slice update request includes a slice identifier (which may be sent with or form part of network slice selection assistance information (NSSAI)) and an associated Tenant ID (which may form part of an MDD vector). The base station 5 responds with an appropriate message (e.g. an slice update response message) at S1502.

Beneficially, base station 5 will be able to use the received information, to make appropriate decisions (e.g. selection of appropriate core network functions for a UE's slices and/or the switching on of appropriate on-demand system information).

Further Information

FIGS. 16 to 20 have been provided, by way of background, to assist the readers understanding of how slicing may be implemented in a telecommunication network. In this regard, FIG. 16 illustrates how different slices/slice types may be supported by different base stations. FIG. 17 illustrates a possible arrangement of a number of possible slice specific core network functions and the interfaces/reference points (i.e. represented by the 'NG*' labels in the figure) between them. FIG. 18 is a simplified schematic illustrating how 'm' slice types for 'n' tenants and Z UEs may be supported via a radio access network (RAN) and core network (CN). FIG. 19 is a simplified schematic illustrating how slices for different UEs communicating via a given RAN may have different sets of slice specific core network functions and/or common control plane network functions. FIG. 20 is a simplified sequence diagram that illustrates a typical connection procedure that may take place in a network comprising a slice selection function (SSF).

Modifications and Alternatives

A number of detailed example embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above example embodiments, a number of software modules were described for implementing the user equipment, base stations and/or core network functions and the like. As those skilled will appreciate, such software modules may be provided in compiled or un-compiled form and may be supplied to the corresponding hardware as a signal over a computer network, or on a recording medium. Further, the functionality performed by part or all of this software may be performed using one or more dedicated hardware circuits. However, the use of software modules is preferred as it facilitates the updating of the corresponding hardware in order to update its functionality. Similarly, although the above embodiments employed transceiver circuitry, at least some of the functionality of the transceiver circuitry can be performed by software.

For example, whilst the functions of the core network are described as being logical functions it will be appreciated that they may be implemented using one or computer processing apparatus having one or more hardware computer processors programmed using appropriate software instructions to provide the required logical functions (e.g. one or more computer processors forming part of the controllers described with reference to FIGS. 5 and 6). It will be further appreciated that all or part of these functions may be implemented in hardware as dedicated circuitry for example using one or more dedicated integrated circuits such as an application specific integrated circuit (ASIC) or the like.

Similarly, the functionality of the user equipment and base stations (gNBs) will typically be implemented using one or computer processing apparatus having one or more hardware computer processors programmed using appropriate software instructions to provide the required functionality (e.g. one or more computer processors forming part of the controllers described with reference to FIGS. 2, 3 and 4). It will be further appreciated that all or part of this functionality may be implemented in hardware as dedicated circuitry for example using one or more dedicated integrated circuits such as an application specific integrated circuit (ASIC) or the like.

It will be appreciated that the controllers referred to in the description of the UE, gNBs and core network nodes/functions (i.e. with reference to FIGS. 2 to 7) may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

It will be appreciated that whilst FIG. 1 shows what appears to be a whole network slice for illustrative purposes, the core can have its own slice and so can a radio access network (RAN). Similarly the control plane (CP) and user plane (UP) can have different slices altogether. Different mapping of RAN Slices to Core Slices can happen depending on standardisation and cellular operator policy.

It will also be appreciated that the tenant may be a wholesale customer such as a mobile virtual network operator (MVNO), or mobile other licensed operator (MOLO), who is a wireless communications services provider that does not own the wireless network infrastructure over which the MVNO/MOLO provides services to its customers. However, tenants need not necessarily be an MVNO/MOLO. Tenants can be corporate customers like multinational companies, a vehicle fleet, emergency services and/or security services (e.g. security companies). Each tenant may have different requirements in terms of what slice type(s) they use based on service level agreements. With the concept of tenants, a mobile network operator can now differentiate between different customer requirements and provide customised services using one or many slices.

It will be appreciated that whilst different apparatus are described as having transceiver circuitry for the purposes of communicating (i.e. transmitting/receiving) data to and from other apparatus/devices, transceiver functionality may also be implemented in software, run on a corresponding hardware controller, for communicating messages and/or information between different respective functions that are co-located on the same physical apparatus.

It will be appreciated that, alternatively or additionally, the TUPF(s) or at least one additional TUPF(s) can be co-located with the access network (e.g. to enable stationary UE scenarios).

It will be appreciated that instead of the term 'tenant' the term 'participating operator' may also be used.

In the above example embodiments, a telecommunication system operating according to 3GPP standards was described. However, as those skilled in the art will appreciate, the techniques described in the present application can be employed in communications systems operating according to other standards, in particular any Orthogonal Frequency-Division Multiplexing (OFDM)-based system, such as the Worldwide Interoperability for Microwave Access (WiMAX) standard.

In summary, communication apparatus has been described that comprises: a controller and a transceiver; wherein the controller is configured to: generate a message comprising slice support information indicating at least one slice support capability of the communication apparatus; and control the transceiver to transmit said message to a node of a core network.

The slice support information comprises hardware capability information from which said slice support information can be derived. The slice support information may comprise information identifying at least one network slice template (NST) associated with at least one slice supported by the communication apparatus. The slice support information may comprise information identifying at least one area, of which the communication apparatus is part, and in which a communication device can be paged (e.g. at least one of a tracking area code and a radio access network (RAN) paging area code). The controller may be operable to end said message as part of an interface establishment procedure, over a core network to base station interface (e.g. an S1 or NG-C setup procedure). The message may be an interface setup request message for a core network to base station interface (e.g. an S1 or NG-C setup message). The controller may be configured to send said message as part of a configuration update procedure, for said communication apparatus, over a core network to base station interface (e.g. an eNB, gNB or NR-BS configuration procedure). The message may be a configuration update message (e.g. an eNB, gNB or NR-BS configuration update message).

A core node has also been described that comprises: a controller and a transceiver; wherein the controller is configured to: control the transceiver to receive, from communication apparatus, a message comprising slice support information indicating at least one slice support capability of the communication apparatus; and configure information stored at the core node based on the slice support information.

The controller may be configured, when configuring said information stored at the core node, to configure at least one allowed cell list (ACL) based on the slice support information. The controller may be configured to control the transceiver to send, to the or another communication apparatus, said at least one ACL (e.g. in an initial context setup request message). The controller may be configured, when configuring said information stored at the core node, to configure a paging area based on the slice support information. The controller may be configured to control the transceiver to send, to the or another communication apparatus, a paging message (e.g. a paging request) comprising information for identifying cells of said configured paging area to said communication apparatus. The information for identifying cells of said configured paging area may be provided in an assistance data for paging information element of said paging message. The controller may be configured, when configuring said information stored at the core node, to configure a handover restriction list based on the slice support information to identify cells to which handover is restricted at a cell level granularity. The controller may be configured to control the transceiver to send, to the or another communication apparatus, said configured handover restriction list (e.g. in at least one of an initial context setup request message and a core network to base station interface based handover request message). The core node may be configured to perform at least one of: a mobility management function (e.g. a mobility management entity); an access management function (AMF); and a session management function (SMF).

Communication apparatus has also been described that comprises: a controller and a transceiver; wherein the controller is configured to: control the transceiver to receive from another communication apparatus, as part of handover procedure for at least one communication device, a message comprising, slice support information relating to at least one slice supported by the at least one communication device; and configure the communication apparatus to support communication of the at least one communication device based on the slice support information by at least one of: selecting appropriate slice specific core network functionality based on the slice support information; and switching on slice specific on-demand system information based on the slice support information.

The slice support information may comprise slice usage information identifying at least one slice (and/or at least one network slice template of a slice) used by the at least one communication device. The slice support information may comprise information identifying at least one tenant and/or corresponding slice type associated with the at least one communication device (e.g. at least one multi-dimensional descriptor (MDD) vector). The slice support information may comprise information identifying at least one core network function (e.g. an access management function (AMF), a session management function (SMF) and/or a user plane function) associated with at least one slice used by the at least one communication device. The slice support information may comprise network slice selection assistance information (NSSAI) associated with at least one slice used by the at least one communication device.

Communication apparatus has also been described that comprises: a controller and a transceiver; wherein the controller is configured to: control the transceiver to receive from another communication apparatus, as part of procedure for configuring dual connectivity for at least one communication device, a message comprising, slice support information relating to at least one slice supported by the at least one communication device; and configure the communication apparatus for dual connectivity based on the slice support information.

The message may comprise a secondary base station addition request (e.g. and SeNB/SgNB addition request) message.

Communication apparatus has also been described that comprises: a controller and a transceiver; wherein the controller is configured to: control the transceiver to receive, from at least one communication device, as part of a connection reestablishment procedure, a connection reestablishment message comprising, slice support information relating to at least one slice supported by that at least one communication device; and configure the communication apparatus to support reestablishment of a connection with the communication device based on the slice support information.

The connection reestablishment message may comprise at least one of a connection reestablishment request message and a connection reestablishment complete message.

A communication device has also been described that comprises: a controller and a transceiver; wherein the controller is configured to: control the transceiver to transmit, to communication apparatus, as part of a connection reestablishment procedure, a connection reestablishment message comprising, slice support information relating to at least one slice supported by that communication device.

Communication apparatus has also been described that comprises: a controller and a transceiver; wherein the controller is configured to: control the transceiver to receive, from a core node, at least one message comprising, for at least one communication device, slice support information relating to at least one slice used by that at least one communication device; and configure the communication apparatus to support communication of the at least one communication device based on the slice support information.

The at least one message comprising slice support information may be received as part of at least one of: an initial context setup procedure; a user equipment (UE) context modification procedure; a core network to base station interface based handover procedure; a base station to base station interface based handover procedure; a paging procedure; and a slice update procedure. The at least one message may comprise at least one of: an initial context setup request message; a user equipment (UE) context modification request message; a core network to base station interface based handover request message; a path switch request acknowledge message; a paging message; and a slice update request message. The controller may be configured to configure the communication apparatus to support communication of the at least one communication device based on the slice support information by at least one of: selecting appropriate slice specific core network functionality based on the slice support information; and switching on slice specific on-demand system information based on the slice support information.

In the above examples, a mobile telephone based telecommunication system was described. As those skilled in the art will appreciate, the techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, and the like.

Various other modifications will be apparent to those skilled in the art and will not be described in further detail here.

The invention claimed is:

1. A mobile device comprising:
at least one memory storing instructions; and
at least one processor configured to process the instructions to:
receive system information including first information corresponding to at least one type of at least one supported slice and second information indicating at least one particular cell corresponding to the at least one type of the at least one supported slice; and perform a cell selection or an initial access procedure on a slice indicated by the first information and the second information, wherein the first information corresponding to the at least one type of the at least one supported slice indicates:
information indicating at least one slice/service type, and
information for differentiating at least one slice corresponding to each of the at least one slice/service type, and wherein the at least one slice/service type includes:
at least one operator common type including:
enhanced mobile broadband (eMBB)
critical communication for high reliability and low latency, and
massive communication for Internet of Things, and
at least one operator specific type.

2. A base station comprising:
at least one memory storing instructions; and
at least one processor configured to process the instructions to:
transmit, to a mobile device, system information including first information corresponding to at least one type of at least one supported slice and second information indicating at least one particular cell corresponding to the at least one type of the at least one supported slice; and
perform a cell selection or an initial access procedure on a slice indicated by the first information and the second information,
wherein the first information corresponding to the at least one type of the at least one supported slice indicates:
information indicating at least one slice/service type, and
information for differentiating at least one slice corresponding to each of the at least one slice/service type, and
wherein the at least one slice/service type includes:
at least one operator common type including:
enhanced mobile broadband (eMBB),
critical communication for high reliability and low latency, and
massive communication for Internet of Things, and
at least one operator specific type.

3. A method for a mobile device, the method comprising:
receiving system information including first information corresponding to at least one type of at least one supported slice and second information indicating at least one particular cell corresponding to the at least one type of the at least one supported slice; and
performing a cell selection or an initial access procedure on a slice indicated by the first information and the second information,
wherein the first information corresponding to the at least one type of the at least one supported slice indicates:
information indicating at least one slice/service type, and
information for differentiating at least one slice corresponding to each of the at least one slice/service type, and
wherein the at least one slice/service type includes:
at least one operator common type including:
enhanced mobile broadband (eMBB),
critical communication for high reliability and low latency, and
massive communication for Internet of Things, and
at least one operator specific type.

4. A method for a base station, the method comprising:
transmitting, to a mobile device, system information including first information corresponding to at least one type of at least one supported slice and second information indicating at least one particular cell corresponding to the at least one type of the at least one supported slice; and
performing a cell selection or an initial access procedure on a slice indicated by the first information and the second information,
wherein the first information corresponding to the at least one type of the at least one supported slice indicates:
information indicating at least one slice/service type, and
information for differentiating at least one slice corresponding to each of the at least one slice/service type,
wherein the at least one slice/service type includes:
at least one operator common type including:
enhanced mobile broadband (eMBB),
critical communication for high reliability and low latency, and
massive communication for Internet of Things, and
at least one operator specific type.

* * * * *